United States Patent
Kamata et al.

(10) Patent No.: US 7,274,826 B2
(45) Date of Patent: Sep. 25, 2007

(54) IMAGE INFORMATION COMPRESSING METHOD, IMAGE INFORMATION COMPRESSING DEVICE AND IMAGE INFORMATION COMPRESSING PROGRAM

(76) Inventors: Seiichiro Kamata, 3884-9, Tonno, Nogata-shi, Fukuoka (JP) 822-0002; Katsunori Matsuo, c/o Kyushu Electronics Systems Inc., 3-3, Kongo 2-chome, Yahatanishi-ku, Kitakyushu-shi, Fukuoka (JP) 807-1263

( * ) Notice: Subject to any disclaimer, the term of this patent is extended or adjusted under 35 U.S.C. 154(b) by 633 days.

(21) Appl. No.: 10/498,818

(22) PCT Filed: Jan. 9, 2002

(86) PCT No.: PCT/JP02/00038
§ 371 (c)(1),
(2), (4) Date: Jun. 23, 2004

(87) PCT Pub. No.: WO03/056836
PCT Pub. Date: Jul. 10, 2003

(65) Prior Publication Data
US 2005/0063601 A1    Mar. 24, 2005

(30) Foreign Application Priority Data
Dec. 25, 2001   (JP) ............................. 2001-392738

(51) Int. Cl.
G06K 9/36   (2006.01)
G06K 9/46   (2006.01)

(52) U.S. Cl. ........................................ 382/243; 382/190

(58) Field of Classification Search ................ 382/164, 382/172, 173, 190, 232, 233, 236, 242, 243, 382/246, 251, 252, 253, 272; 375/240.08, 375/240.09, 240.16, 240.22, 240.25, 240.27
See application file for complete search history.

(56) References Cited

U.S. PATENT DOCUMENTS
6,178,261 B1 *   1/2001   Williams et al. ............ 382/190

(Continued)

FOREIGN PATENT DOCUMENTS
JP          03006187        1/1991

(Continued)

OTHER PUBLICATIONS

Johnson K. Yan and David J. Sakrison, "Encoding of Images Based on a Two-Component Source Model", IEEE Transactions On Communications, vol. Com-25, No. 11, Nov. 1977, pp. 1315-1322.

Primary Examiner—Amir Alavi
(74) Attorney, Agent, or Firm—Banner & Witcoff, Ltd.

(57) ABSTRACT

The present invention provides an image information compressing apparatus of high coding efficiency with little deterioration in picture quality, capable of effectively extracting feature components from an image in an image information feature-extraction and coding method. An image information compressing apparatus 1 for performing feature extraction and coding on an original image includes a pseudo-Hilbert scanning means (5) for converting a two-dimensional or three-dimensional original image into one-dimensional original data by pseudo-Hilbert scan, a first feature information extracting means (6) for extracting first feature information by generating first feature data by approximating the one-dimensional original data by a predetermined function having redundancy larger than that of the one-dimensional original data, a first coding means (7) for coding the first feature information, thereby generating first feature coded data, a second feature information extracting means (8) for extracting second feature information by subtracting the first feature information from the original image, and a second coding means (9) for generating second feature coded data by coding the second feature information.

21 Claims, 12 Drawing Sheets

U.S. PATENT DOCUMENTS

| | | |
|---|---|---|
| 6,542,545 B1 * | 4/2003 | Vetro et al. ............ 375/240.08 |
| 6,571,015 B1 * | 5/2003 | Matsuo et al. ............. 382/232 |
| 6,687,401 B2 * | 2/2004 | Naoi et al. .................. 382/190 |
| 6,876,771 B2 * | 4/2005 | Prakash et al. ............. 382/239 |
| 6,983,021 B2 * | 1/2006 | Pesquet-Popescu et al. ..................... 375/240.16 |
| 2003/0133611 A1 * | 7/2003 | Deco et al. ................. 382/190 |
| 2005/0063601 A1 * | 3/2005 | Kamata et al. ............. 382/243 |

FOREIGN PATENT DOCUMENTS

| | | |
|---|---|---|
| JP | 06038047 | 2/1994 |
| JP | 8-140097 A | 5/1996 |
| JP | 10051785 | 2/1998 |
| JP | 11331613 | 11/1999 |
| JP | 11-353453 A | 12/1999 |
| JP | 2000-253396 A | 9/2000 |
| JP | 2001-118075 | 4/2001 |
| JP | 2001-333431 A | 11/2001 |
| JP | 2003199105 | 7/2003 |

\* cited by examiner

IMAGE INFORMATION COMPRESSING METHOD, IMAGE INFORMATION COMPRESSING DEVICE AND IMAGE INFORMATION COMPRESSING PROGRAM

This is a U.S. National Phase Application under 35 U.S.C. § 371 and applicant herewith claims the benefit of priority of PCT/JP02/00038 filed on Jan. 9, 2002, which was published Under PCT Article 21(2) in English, and of Application No. 2001-392738 filed in Japan on Dec. 25, 2001.

TECHNICAL FIELD

The present invention relates to a method of compressing two-dimensional or three-dimensional image information and, particularly, to an image information compressing method of compressing image information by image feature extraction and coding.

BACKGROUND ART

Hitherto, as an image information compressing method, a feature extracting and coding method of separating image information every pattern included in the image information into two pieces of feature data, and encoding each feature data, thereby compressing the image information is known. An example of the image information compressing method using the feature extraction and coding is disclosed by Johnson K. Yan and David J. Sakrison, "Encoding of Images Based on a Two-component Source Model", IEEE Transaction on Communications, Vol. COM-25, No. 11 (1977). According to the method, first, cubic root intensity $u(x, y)=[i(x, y)]^{1/3}$ is obtained from one-dimensional original data $i(x, y)$ converting from original image data by raster scan. The cubic root intensity $u(x, y)$ is separated to a non-continuous component $d(x, y)$ and the remaining component $r(x, y)$ by smoothing, and each of the components is encoded.

In this case, an edge component and a contrast component of the image are included in the non-continuous component $d(x, y)$, and a texture component of the image is included in the remaining component $r(x, y)$, so that the original image is separated into feature components, and each of the feature components is optimally encoded.

However, in the conventional image information compressing method, a spectrum of the one-dimensional original data obtained by raster scan includes many high frequency components. Consequently, at the time of smoothing the one-dimensional original data, the edge component and the contrast component are not sufficiently converted by a smoothing function, but remain as the remaining components. Therefore, sufficiently high coding efficiency cannot be obtained. If the information of the remaining components is reduced in order to increase the coding efficiency, a problem occurs such that deterioration on an image increases.

An object of the present invention is to provide an image information compressing method capable of effectively separating an image into feature components and achieving higher coding efficiency with little deterioration in picture quality in an image information feature separating and coding method.

DISCLOSURE OF THE INVENTION

In order to solve the problem, an image information compressing method of the present invention for performing feature extraction and coding on an original image, comprising: converting a two-dimensional or three-dimensional original image into one-dimensional original data by pseudo-Hilbert scan; extracting first feature information by approximating the one-dimensional original data by a predetermined function having redundancy larger than that of the one-dimensional original data to generate first feature data; coding the first feature information, thereby obtaining first feature coded data; extracting second feature information by subtracting the first feature information from the original image; and coding the second feature information, thereby obtaining second feature coded data. With the configuration, the following actions are obtained.

First, by pseudo-Hilbert scan, a two-dimensional or three-dimensional original image is converted to one-dimensional original data having spectral characteristics of a small amount of high frequency components and a large amount of low frequency components. The pseudo-Hilbert scan has a characteristic of scanning an image on a square or rectangle block unit basis. Generally, an image has characteristics in that correlation among pixel values in a block is high and a change in the pixel value in a block is gentle on the average. Therefore, the power spectrum of one-dimensional original data obtained by the pseudo-Hilbert scan is concentrated in the low frequency region, and the pseudo-Hilbert scan has a characteristic in that an amount of high frequency components is extremely small as compared with that in generally used raster scan.

The one-dimensional original data is approximated by a predetermined function having redundancy larger than that of the one-dimensional original data, and the approximation function value is used as first feature data. By subtracting the first feature data from the original image, second feature data is generated. Since the spectral characteristic of one-dimensional original data is a small amount of high frequency components, by properly selecting the predetermined function, an approximation error in the case of performing approximation with the predetermined function can be reduced, an absolute value average of each value of the second feature data can be made smaller than that of each value of the one-dimensional original data, and a feature component in an original image can be sufficiently extracted. In this case, a contrast component and an edge component of an original image are included mainly in the first feature data, and a texture component is included mainly in the second feature data. Further, although the coding amount of the first feature data is equal to that of an original image, redundancy of the first feature data is larger than that of the original image. Consequently, the first feature data can be coded at high efficiency.

On the other hand, the second feature data is data obtained by subtracting the first feature data from the original image. Therefore, the second feature data hardly includes the contrast component and the edge component of the original image, but includes mainly a high frequency component of the original image. Since the spectral characteristics of the second feature data are deviated to the high frequency side, by employing a coding method adapted to the spectral characteristics, the second feature data can be coded at high coding efficiency. Therefore, an original image can be coded at high coding efficiency as a whole.

The "original image" is not limited to a still image, but may be a moving image made by a series of plural frames which are continuous in the time direction. The expression "two-dimensional or three-dimensional" image is used for the reason that, in the case of a still image, an original image is two-dimensional and, in the case of a moving image, a plurality of frames overlap in the time base direction and an original image is a three-dimensional image. The "feature extraction and coding" denotes an image coding method of extracting feature components included in an image and coding each of the feature components. The "pseudo-Hilbert scan" is a scan performed along a Hilbert curve expanded so as to be applied to a rectangle region or a cubic region. The detailed description will not be given here since the details of the pseudo-Hilbert scan are already disclosed in Japanese Unexamined Patent Publication No. 11-353453 (1999), The IEICE Transactions (D-II), Vol. J80-D-II, No. 10, pp. 2864-2867, October 1997, S. Kamata and Y. Bandoh, "An Address Generator of a Pseudo-Hilbert Scan in a Rectangle Region", Proc. of Int. Conf. on Image Processing, Vol. 1, Santa Barbara, Calif., pp. 707-710 (Oct. 26 to 29, 1997), Y. Bandoh and S. Kamata, "An Address Generator for a 3-Dimensional Pseudo-Hilbert Scan in a Cuboid Region", 1999 IEEE Int. Conf. on Image Processing, Kobe, Japan (Oct. 25-28, 1999), and the like. The "pseudo-Hilbert scan" is not limited to two-dimensional pseudo-Hilbert scan, but may be three-dimensional pseudo-Hilbert scan. In the case of a still image, an original image is constructed by only one frame, so that the two-dimensional pseudo-Hilbert scan is used. In the case of a moving image, an original image is a three-dimensional image, so that not only the two-dimensional pseudo-Hilbert scan but also three-dimensional pseudo-Hilbert scan can be performed on a set of a predetermined number of frames. The two-dimensional pseudo-Hilbert scan is disclosed in the IEICE transactions (D-II), Vol. J80-D-II, No. 10, pp. 2864-2867, October 1997, and the like. The three-dimensional pseudo-Hilbert scan is disclosed in Japanese Unexamined Patent Publication No. 11-353453 (1999), the IEICE transactions (D-II), Vol. J81-D-II, No. 10, pp. 2483-2486, October 1998, Japanese Unexamined Patent Publication No. 2000-253396, and the like. The "predetermined function" is not limited to a particular function but, for example, a step function, a broken line function, a spline function or the like is used. However, in consideration of high speed of calculation process and a characteristic of easily taking an edge component, it is preferable to use the step function. Further, "large redundancy" means that an auto correlation function of the first feature data is larger than that of the one-dimensional original data. Consequently, the first feature data can be coded at high coding efficiency. The "first feature data" is data made by a series of one-dimensional data obtained by approximating one-dimensional original data by a predetermined function. The "first feature information" denotes information of the first feature data. The "second feature information" denotes information obtained by subtracting the first feature information from an original image and includes information of a data series obtained by subtracting the first feature data from the one-dimensional original data, and information of an image obtained by subtracting a first feature image formed by filling a two-dimensional or three-dimensional space with the first feature data by pseudo-Hilbert scan from an original image. A method of "coding first feature information" or "coding second feature information" is not particularly limited. A general coding method such as quantization or entropy coding is used.

An image information compressing apparatus of the present invention for performing feature extraction and coding on an original image, comprises: pseudo-Hilbert scanning means for converting a two-dimensional or three-dimensional original image into one-dimensional original data by pseudo-Hilbert scan; first feature information extracting means for extracting first feature information by generating first feature data by approximating the one-dimensional original data by a predetermined function having redundancy larger than that of the one-dimensional original data; first coding means for coding the first feature information, thereby generating first feature coded data; second feature information extracting means for extracting second feature information by subtracting the first feature information from the original image; and second coding means for generating second feature coded data by coding the second feature information.

With the configuration, as described above, an original image can be coded at high coding efficiency as a whole.

In the case where the original image is constructed by a series of plural frames which are continuous in a time direction, at the time of extracting the first feature information, with respect to a predetermined frame, first feature information is extracted by generating first feature data by approximating the one-dimensional original data by a predetermined function having redundancy larger than that of the one-dimensional original data, and the first feature data is stored into the first feature data storing means. With respect to the other frames, first feature data can be generated by generating first difference data by subtracting first feature data of a past frame stored in the first feature data storing means from the one-dimensional original data, and approximating the first difference data by a predetermined function having redundancy larger than that of the first difference data.

In the case of an original image whose frames are continuous in the time direction like a moving image, the correlation between continuous frames may be high. In this case, the first feature data of a past frame is subtracted from present one-dimensional original data, thereby obtaining first difference data. In the first difference data, most of components which change a little in the time direction of the original image are eliminated. As a result, the coding efficiency of an original moving image can be further improved.

The "predetermined frame" denotes a frame having no correlation or low correlation with a past frame and is, for example, a first frame or a frame obtained immediately after a scene change. The "past frame" denotes a frame subjected to image information compression before the frame which is being subjected to image information compression at present.

At the time of extracting the second feature information, second feature data is generated by subtracting the first feature data from the one-dimensional original data, a second feature image is decompressed by filling a two-dimensional or three-dimensional space with the second feature data by pseudo-Hilbert scan, the second feature image is developed to the space constructed by the base vectors by using the base vectors stored in a base vector table, and a component value of the second feature image for a predetermined base vector in the space constructed by the base vectors is coded, thereby obtaining second feature coded data.

At the time of extracting the second feature information, a first feature image is decompressed by filling a two-dimensional or three-dimensional space with the first feature data by pseudo-Hilbert scan, a second feature image is generated by subtracting the first feature image from the original image, the second feature image is developed to the space constructed by the base vectors by using the base vectors stored in a base vector table, and a component value of the second feature image for a predetermined base vector in the space constructed by the base vectors is coded, thereby obtaining second feature coded data.

As described above, the pseudo-Hilbert scan is used at the time of converting an original image to one-dimensional original data, so that the one-dimensional original data has a spectral characteristic of a small amount of high frequency components and a large amount of low frequency components. By approximating the one-dimensional original data by a predetermined function, contrast components (DC components and low frequency components) and an edge component (contour component of an image) of an original image are included mainly in the first feature information, and the remaining texture components are included mainly in the second feature information. The texture component has a characteristic that the power spectrum is deviated to the high frequency side. Therefore, in the case of developing the second feature information to the space constructed by base vectors, there is a tendency that spectra are concentrated on some base components corresponding to intermediate and high frequency components other than the DC components and low frequency components.

Consequently, at the time of developing second feature information to a space constructed by base vectors by using a plurality of test pattern images in advance, some base components which are the most effective on the average are specified, and base vectors for developing the second feature image to those base components are obtained and stored in the base vector table. In the case of developing a second feature image to the space constructed by the base vectors, the base vectors stored in the base vector table are regarded as the base vectors to develop the second feature image to the most effective base components.

At the time of image information compression, by developing a second feature image to a space constructed by base vectors by using the base vectors preliminarily stored in the base vector table (that is, by calculating an inner product between the second feature image and the base vector), high-speed image coding can be performed at high coding efficiency without much deterioration in the S/N ratio of picture quality The "space constructed by base vectors" denotes a space into which a pattern is mapped by feature extraction. For the mapping, orthogonal transformation such as Karhunen-Loéve transform (hereinafter, referred to as "KL transform"), discrete cosine transform (hereinafter, referred to as "DCT"), or discrete sine transform (hereinafter, referred to as "DST") is used. "Development to a space constructed by base vectors" means to map a second feature image to a space constructed by base vectors and is, specifically, performed by calculating an inner product between each of the base vectors and the second feature image. As "a predetermined base vector in a space constructed by base vectors", a base vector most effectively expressing the feature of the second feature image is chosen among the base vectors in the space constructed by the base vectors. For example, in the case of using KL transform for feature extraction, the predetermined base vectors are some base vectors selected in order from the largest variance of the base component of each pixel at the time of mapping pixels of the second feature image to the feature space. In the case of using DTC for feature extraction, the predetermined base vectors are some base vectors selected in order from frequency components of the largest spectrum of the second feature image.

At the time of developing the second feature image to the space constructed by the base vectors, it is not always necessary to develop the second feature image with respect to all of base vectors. It is also possible to develop the second feature image only for the base vectors which are preliminarily set, and regard the component values for the other base vectors as zero. Specifically, it is also possible to preliminarily select some base vectors at which component values become significant values on the average by using test pattern images and develop the second feature image only for the base vectors. Also in such a manner, a decrease amount of the S/N ratio of picture quality is small and the calculation amount at the time of developing the second feature image decreases, so that high-speed process can be performed while suppressing increase in coding noise.

At the time of extracting the second feature information, second feature data is generated by subtracting the first feature data from the one-dimensional original data, the second feature data is developed to a space constructed by base vectors by using the base vectors stored in a base vector table, and a component value of the second feature data for a predetermined base vector in the space constructed by the base vectors is coded, thereby obtaining second feature coded data.

With the configuration, in a manner similar to the image information compressing method, deterioration in the S/N ratio of picture quality is little and high-speed image coding can be realized. In addition, one-dimensional error data is subjected as it is to orthogonal transformation and compressed. Thus, the calculation amount is small and higher-speed image coding is realized.

At the time of coding the second feature information, the component value of the second feature image or the second feature data only for the base vector at which the component value of the second feature image or the second feature data in the space constructed by the base vectors is equal to or more than a predetermined threshold is coded, thereby obtaining second feature coded data.

In the present invention, the pseudo-Hilbert scan is used at the time of converting an original image to one-dimensional original data, so that most of contrast components and edge components of an original image are included mainly in the first feature coded data. Therefore, even when only component values which become equal to or more than a predetermined threshold are left among the component values of the second feature image for the base vectors in the space constructed by the base vectors and the remaining small component values are regarded as zero, deterioration in picture quality at the time of decompressing an original image visually is suppressed for the following reason. When a human being perceives an image, he/she perceives features of the image from a contour portion or a big pattern, if the contrast component and the edge component are sufficiently reproduced, even if reproducibility of fine texture is not so high, the human being visually recognizes that there is little deterioration in the picture quality. That is, with the configuration, while suppressing deterioration in visual picture quality at the time of decompressing an original image, the coding efficiency of coding by the second coding means can be improved.

The "predetermined threshold" can be freely set in accordance with the kind, purpose and the like of an image to be coded. When the threshold is set to be large, the coding efficiency improves, but the S/N ratio of the coded image deteriorates.

At the time of coding the second feature information, the base vector used to develop the second feature image or the second feature data is determined on the basis of a cumulative error between the one-dimensional original data and the first feature data, the second feature image or the second feature data is developed to the determined base vectors, and a component value of the second feature image or the second feature data for the base vector is coded, thereby generating second feature coded data.

Consequently, a set of base vectors of the space constructed by base vectors whose component values are significant values is properly set in accordance with a pattern of an original image, the component values only for the set of base vectors are calculated, and the component values for the other base vectors are regarded as zero, so that high coding efficiency can be achieved without increasing coding noise of picture quality. Since it is unnecessary to calculate the component values of the second feature image for all of the base vectors in the space constructed by the base vectors, high-speed coding process can be performed.

The "cumulative error" is a value obtained by adding up absolute values, square values or the like of the difference between one-dimensional original data and first feature data with respect to all of pixels. As a method of determining the base vector "on the basis of a cumulative error", for example, the relation between the magnitude of the cumulative error and the component value for each base vector is obtained in advance by using a test pattern, and a corresponding relation between the magnitude of the cumulative error and a base vector for which the component value is significant is registered in a determination table. At the time of image information compression, a base vector is determined with reference to the determination table in accordance with the magnitude of the cumulative error.

The first feature data is made by a series of data according to a step function which changes step by step every predetermined interval, a data value of the first feature data in each of the intervals is equal to an average value in the interval of the one-dimensional original data, and the data series can be divided into the intervals so that a cumulative error in all of the intervals between the one-dimensional original data and the first feature data becomes the minimum.

With the configuration, approximation by a simple step function is used, so that the algorithm of approximation calculation process is simple, the calculation amount of the approximation calculation process is small, and high processing speed can be achieved. By performing approximation with the step function divided in the intervals so that the cumulative error between the one-dimensional original data and the first feature data becomes the minimum, smoothing of a sharp edge portion in an image and blurring of a contour portion in the image like mosquito noise can be prevented. Therefore, the contour portion in the image is accurately kept in the first feature coded data. At the time of decompressing the first feature image from the first feature coded data, the contour of an image in the first feature image is clear, so that the user can visually accurately recognize the image.

The first feature data is made by a series of data according to a step function which changes step by step every predetermined interval, a data value of the first feature data in each of the intervals is equal to an average value in the interval of the one-dimensional original data, and the data series is divided into the intervals so that a cumulative error in each of the intervals between the one-dimensional original data and the first feature data becomes equal to or less than a predetermined threshold.

With the configuration, approximation by a simple step function is used, so that the algorithm of approximation calculation process is simple, the calculation amount of the approximation calculation process is small, and high processing speed can be achieved. By sequentially performing the approximation calculation process from the head of one-dimensional data, the interval division can be performed. Thus, the memory amount required for the approximation calculation process is small, the calculation amount is small, and high processing speed can be achieved. Further, by performing approximation with a step function divided in the intervals so that the cumulative error between the one-dimensional original data and the first feature data in each interval becomes the minimum, smoothing of a sharp edge portion in an image and blurring of a contour portion in the image can be prevented. Therefore, the contour portion in the image is kept in the first feature coded data. At the time of decompressing the first feature image from the first feature coded data, the contour of an image in the first feature image is clear so that the user can visually accurately recognize the image.

BEST MODE FOR CARRYING OUT THE INVENTION

Embodiments of the present invention will be described below with reference to the drawings.

EMBODIMENT 1

Figure 1:
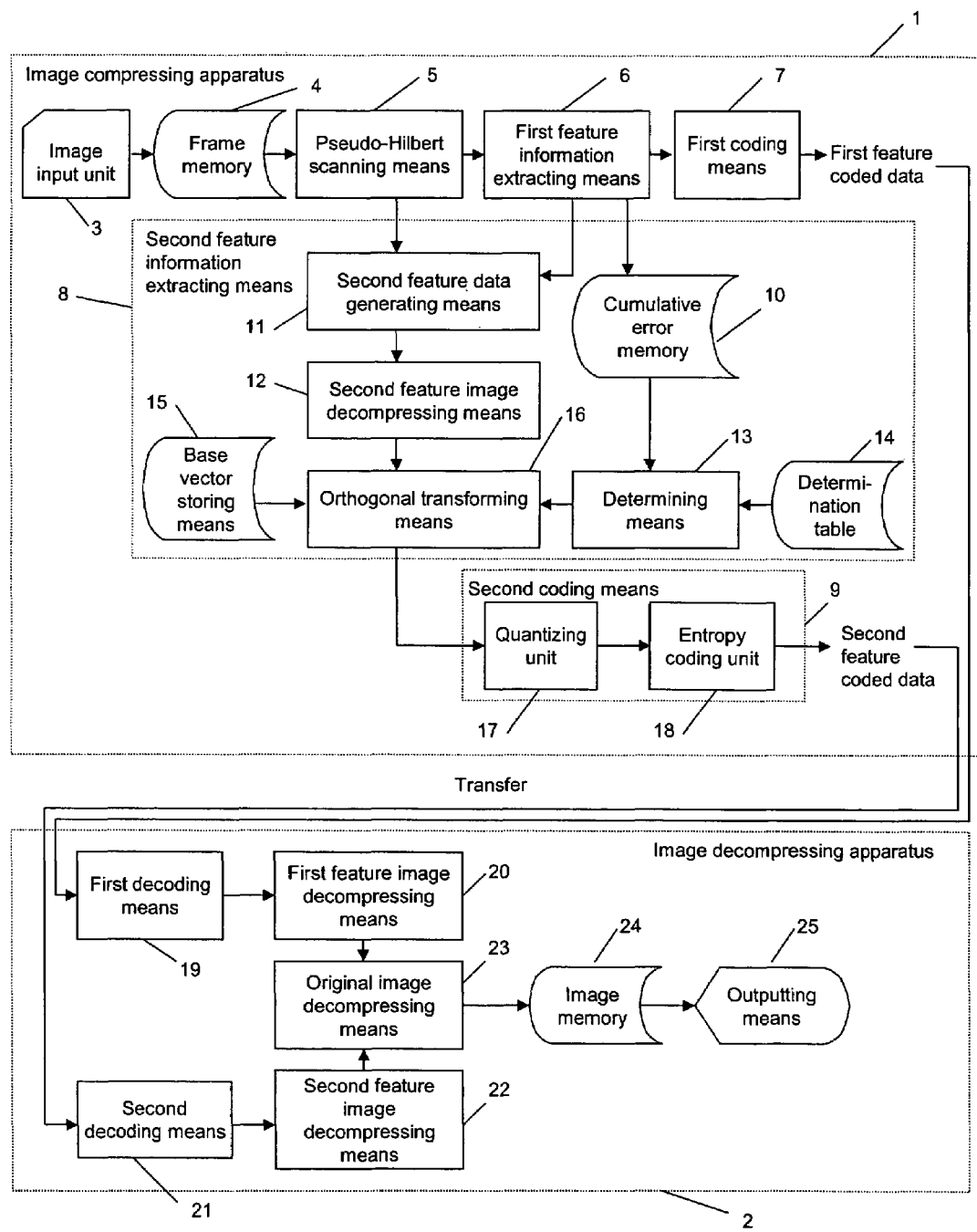
FIG. 1 is a block diagram of an image information compressing apparatus and an image decompressing apparatus according to Embodiment 1 of the present invention.

FIG. 1 is a block diagram of an image information compressing apparatus and an image decompressing apparatus according to Embodiment 1 of the present invention.

In FIG. 1, 1 denotes an image compressing apparatus and 2 denotes an image decompressing apparatus.

The image compressing apparatus 1 includes an image input unit 3, a frame memory 4, a pseudo-Hilbert scanning means 5, a first feature information extracting means 6, a first coding means 7, a second feature information extracting means 8, and a second coding means 9. The image input unit 3 has the function of inputting a two-dimensional or three-dimensional original image from the outside of the apparatus and, specifically, takes the form of an image input device such as a scanner or a video camera. The frame memory 4 temporarily stores the original image input to the image input unit 3. The pseudo-Hilbert scanning means 5 converts the original image stored in the frame memory 4 into one-dimensional original data by pseudo-Hilbert scan. The first feature information extracting means 6 generates first feature data by approximating the one-dimensional original data by a predetermined function, and stores a cumulative error in a cumulative error memory 10. The first coding means 7 generates first feature coded data by compressing the first feature data by entropy coding.

The second feature information extracting means 8 is constructed by the cumulative error memory 10, a second feature data generating means 11, a second feature image decompressing means 12, a determining means 13, a determination table 14, a base vector storing means 15, and an orthogonal transforming means 16. The cumulative error memory 10 stores a cumulative square error between the one-dimensional original data and the first feature data. The second feature data generating means 11 generates one-dimensional second feature data by calculating the difference between the one-dimensional original data and the first feature data. The second feature image decompressing means 12 decompresses the one-dimensional second feature data to a two-dimensional or three-dimensional second feature image by pseudo-Hilbert scan. On the basis of the cumulative square error stored in the cumulative error memory 10, the determining means 13 determines a set of base vectors of which inner product has to be calculated by the orthogonal transforming means with reference to the determination table 14. In the determination table 14, a list indicative of the correspondence between the magnitude of the cumulative square error and the set of base vectors of which component value is significantly large is stored. The correspondence is preliminarily registered by calculating a set of base vectors necessary for the magnitude of the cumulative square error by obtaining the relation between the magnitude of a cumulative error and a component value of each of the base vectors by using a test pattern.

The base vector storing means 15 stores a base vector table made by a collection of base vectors used at the time of orthogonally transforming the second feature image. For preliminarily developing the second feature information to a space constructed by base vectors by using a plurality of test pattern images, some base components which are the most effective on an average are specified, and base vectors for developing the second feature image to the base components are obtained and stored in the base vector table. The orthogonal transforming means 16 calculates the inner product between each of the base vectors stored in the base vector storing means 15 and the second feature image.

The second coding means 9 has the function of coding a set of inner products to thereby generate second feature coded data and is constructed by a quantizing unit 17 and an entropy coding unit 18.

On the other hand, the image decompressing apparatus 2 includes a first decoding means 19, a first feature image decompressing means 20, a second decoding means 21, a second feature image decompressing means 22, an original image decompressing means 23, an image memory 24, and an outputting means 25.

The first decoding means 19 decodes the first feature coded data to decompress the first feature data. The first feature image decompressing means 20 decompresses the first feature data to the two-dimensional or three-dimensional first feature image by pseudo-Hilbert scan. The second decoding means 21 decodes the second feature decoded data and decompresses the set of inner products and the base vectors. The second feature image decompressing means 22 decompresses the two-dimensional or three-dimensional second feature image by making an inverse matrix of the base vectors act onto the set of inner products. The original image decompressing means 23 decompresses the original image by adding the second feature image to the first feature image. The image memory 24 stores the decompressed original image. The outputting means 25 is a device for outputting the decompressed image and takes the form of a display, a printer, a facsimile or the like.

An image information compressing method in the image information compressing apparatus in this embodiment constructed as described above will be described below.

Figure 2:
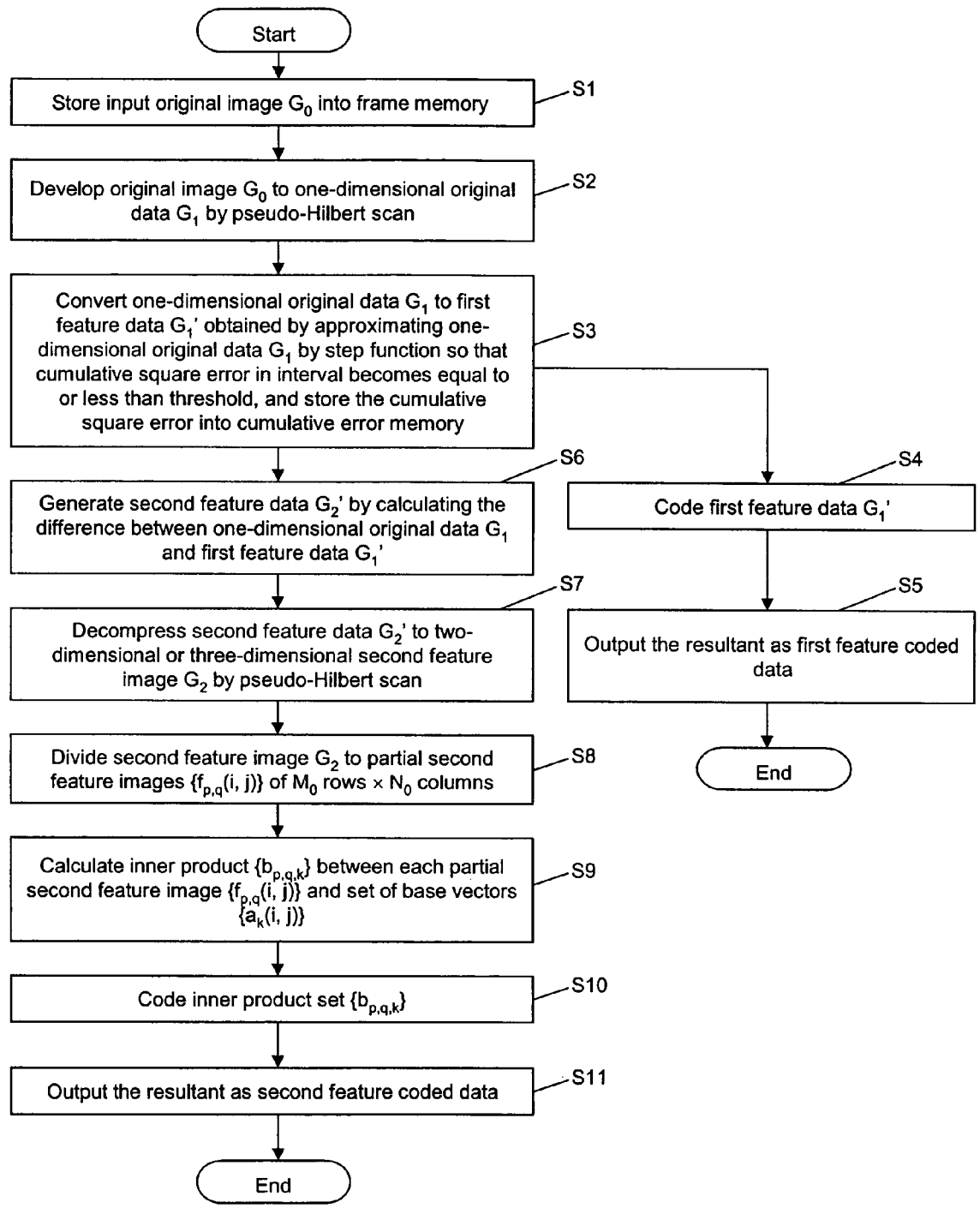
FIG. 2 is a flowchart showing an image information compressing method according to Embodiment 1 of the present invention.

FIG. 2 is a flowchart showing the image information compressing method according to Embodiment 1 of the present invention.

First, when an original image $G_0$ is input from the image input unit 3, the original image $G_0$ is stored in the frame memory 4 (S1). In this case, if the input original image is a still image, the original image $G_0$ is stored as a two-dimensional original image. If the input original image is a moving image, the original image $G_0$ is stored as a three-dimensional original image in which two-dimensional image frames are overlapped in the time base direction.

The pseudo-Hilbert scanning means 5 performs a pseudo-Hilbert scan on the original image $G_0$ stored in the frame memory 4, thereby converting the original image $G_0$ into one-dimensional original data $G_1 = \{g_i: i=1, 2, 3, \ldots, S\}$ (S2). Herein, S indicates the total number of pixels included in the original image $G_0$.

Figure 3:
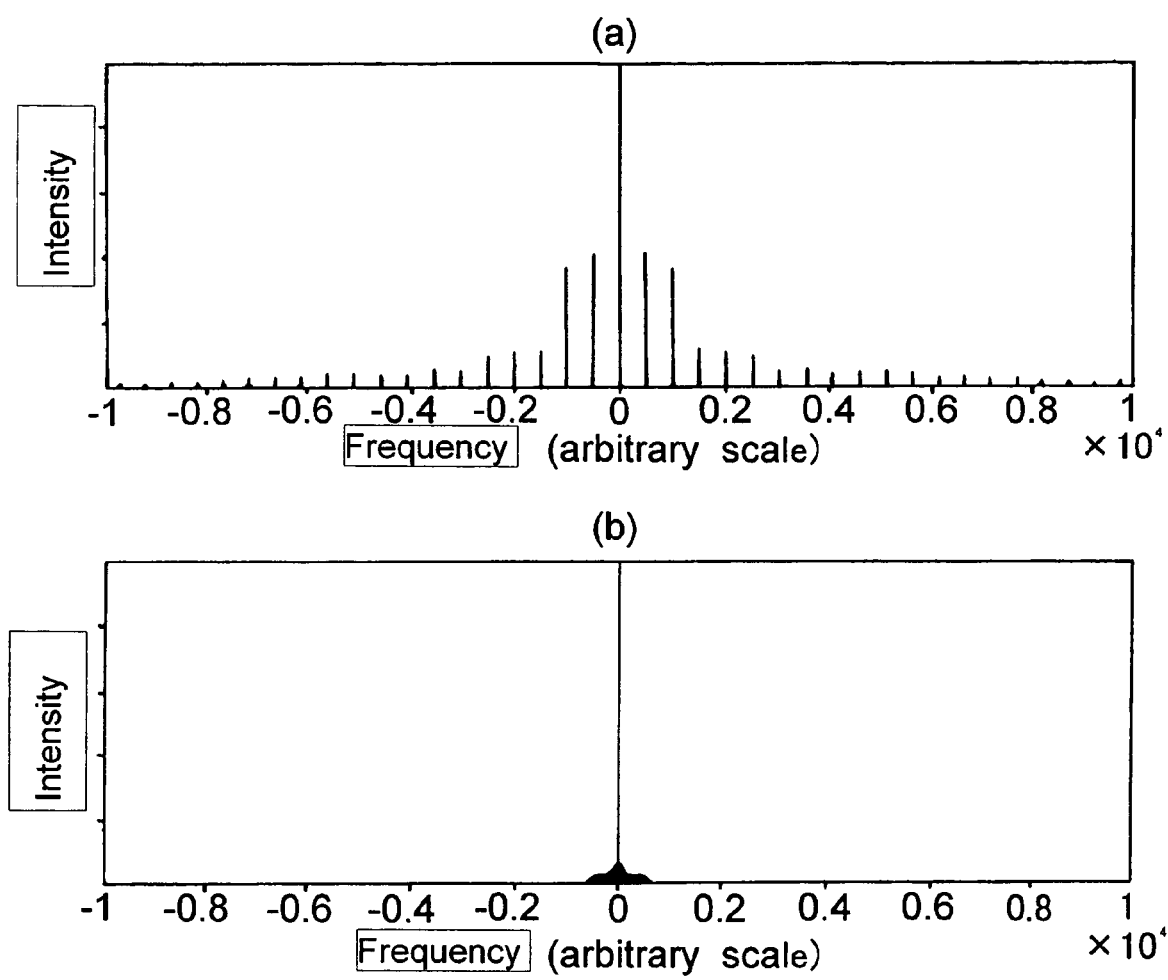
FIGS. 3(a) and 3(b) are diagrams showing comparison between a power spectrum of one-dimensional original data obtained from an image by raster scan and a power spectrum of one-dimensional original data obtained from the image by pseudo-Hilbert scan.

The one-dimensional original data $G_1$ converted by the pseudo-Hilbert scan has a characteristic in that it includes extremely little high frequency components of a spectrum as compared with one-dimensional original data obtained by converting the original image $G_0$ by raster scan or zigzag scan. FIGS. 3(a) and 3(b) are diagrams showing comparison between the power spectrum of the one-dimensional original data obtained from an image by raster scan and that of the one-dimensional original data obtained from the same image by the pseudo-Hilbert scan. FIG. 3(a) shows the power spectrum of the one-dimensional original data obtained by the raster scan and FIG. 3(b) shows the power spectrum of the one-dimensional original data obtained by the pseudo-Hilbert scan. In the case of the raster scan, by repeating an operation of scanning an image to the right end and scanning the image again from the left end, one-dimensional data is obtained Consequently, the one-dimensional original data has a cycle having the width of the image. Since a sharp change occurs in the pixel value when the scan moves from the right end of an image to the left end of the image, a high frequency component is generated and the power spectrum spreads very much to the band of a high frequency. On the other hand, the pseudo-Hilbert scan is performed every block of an image along a pseudo-Hilbert curve as a kind of a space filling curve. Generally, an image has characteristics in that correlation of pixel values in a block is high and a change in the pixel values in the block is gentle on an average. Therefore, the power spectrum of one-dimensional original data obtained by the pseudo-Hilbert scan is concentrated in a low frequency region and the amount of high frequency components is much smaller than that obtained by the raster scan which is generally used. That is, the one-dimensional original data obtained by the pseudo-Hilbert scan includes a very small amount of components which change sharply and a large amount of components which change gently. It means that an error can be reduced also in the case where the one-dimensional original data is approximated by a properly redundant function. Therefore, by selecting a function adapted to extract a specific feature in an image as an approximate function, only a specific feature component in an image can be extracted very efficiently.

The first feature information extracting means 6 converts the one-dimensional original data $G_1$ to first feature data $G_1'=\{c_1, \ldots, c_k: k=1, \ldots, M\}$ obtained by approximation with a step function which changes step by step every predetermined interval (S3). Herein, when it is assumed that the number of continuous $c_k$ is $l_k$, the following is obtained:

$$\sum_{k=1}^{M} l_k = S \quad (1)$$

The value $c_k$ of the first feature data $G_1'$ in each interval k (k=1, 2, . . . , M) is set to an average value in the interval k of the one-dimensional original data $G_1$. That is, it is determined by the following:

$$c_k = \frac{1}{l_k} \sum_{i=p_k}^{p_k+l_k-1} g_i \quad (2)$$

Herein, $p_k$ is the start point of the k-th interval and $p_1=1$, $p_{k+1}=p_k+l_k$. The first feature data $G_1'$ is divided into intervals so that a cumulative square error $e(p_k, l_k)$ between the one-dimensional original data $G_1$ and the first feature data $G_1'$ in each interval k becomes a predetermined threshold $\Gamma$ or less. The cumulative square error $e(p_k, l_k)$ is a value obtained by adding up the square of the difference between the one-dimensional original data $\{g_{pk+i}: i=0, 1, 2, \ldots, l_k-1\}$ and the average value $C_k$ of the one-dimensional original data with respect to all of i and is expressed as follows:

$$e(p_k, l_k) = \sum_{i=p_k}^{p_k+l_k-1} (g_i - c_k)^2 \quad (3)$$

Specifically, the interval division is performed by serial processing as follows:

[1] An average $c_k(N)$ of N pixel values from the pixel pk to the N-1th pixel having the one dimensional original data $G_1=\{g_i: i=1, 2, 3, \ldots, S\}$ is calculated in a manner similar to the equation (2), and [2] a cumulative square error $e(p_k, N)$ is calculated with respect to $c_k(N)$ in a manner similar to the equation (3). In the case where the cumulative square error $e(p_k, N)$ is equal to or less than the threshold $\Gamma$, N is incremented only by one, and the program returns to [1] and repeats similar processes. In the case where the cumulative square error $e(p_k, N)$ is larger than the threshold $\Gamma$, the length of the interval k is set as $l_k=N-1$, the value $\{g_i': i=p_k, P_k+1, \ldots, p_k+l_k-1\}$ of the interval k of the first feature data $G_1'$ is set as $c_k(N-1)$, and the cumulative square error $e(p_k, l_k)$ is stored in the cumulative error memory 10 (S3). Thereafter, k is incremented only by one and, for the next interval, the program returns to [1] and performs similar processes.

Figure 4:
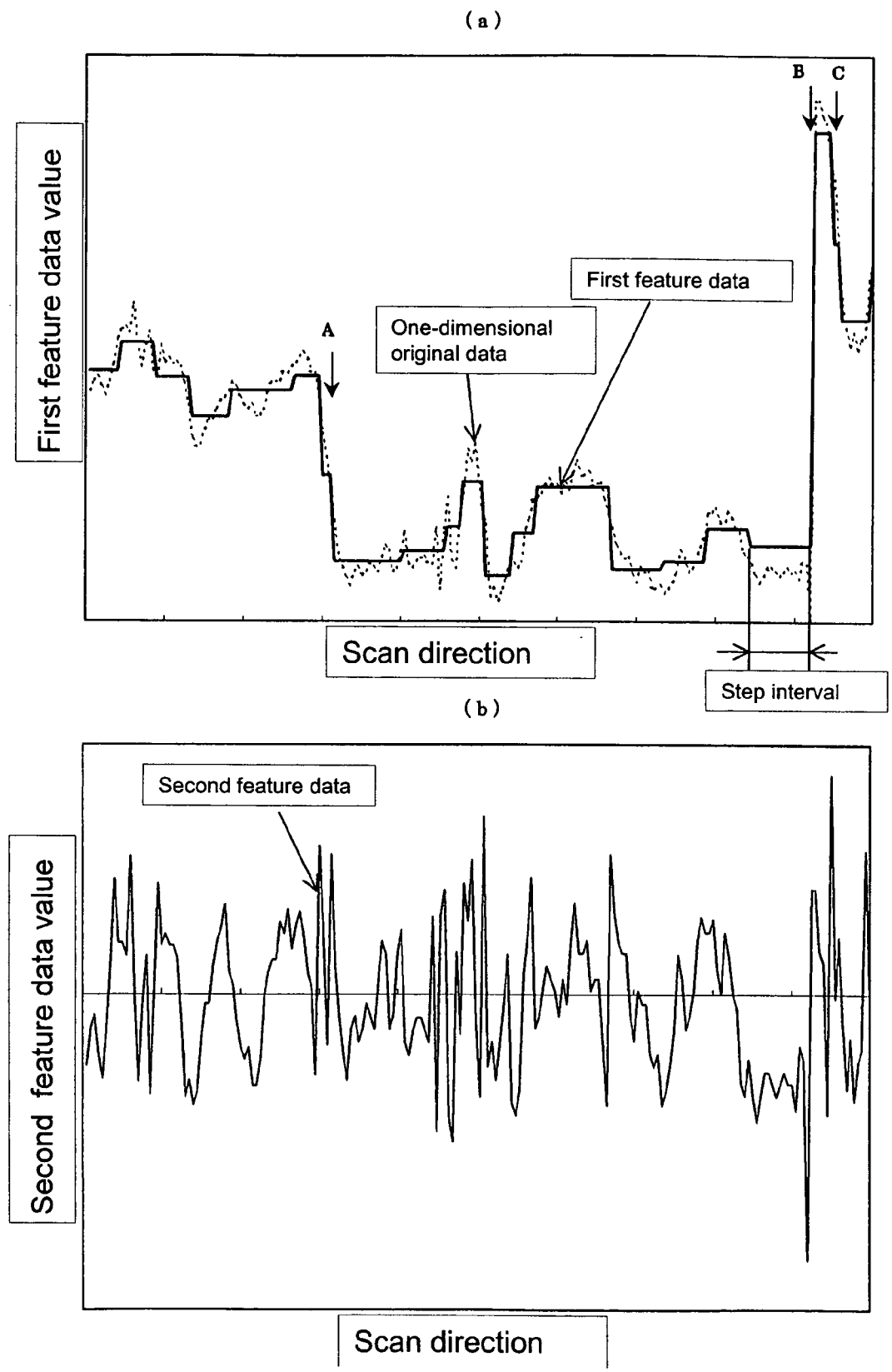
FIGS. 4(a) and 4(b) are diagrams showing the relation between one-dimensional original data $G_1$ and first feature data $G_{1'}$.

The relation between the one-dimensional original data $G_1$ and the first feature data $G_1'$ obtained in such a manner is as shown in FIGS. 4(a) and 4(b).

The broken line in FIG. 4(a) denotes the one-dimensional original data, and the solid line denotes the first feature data. FIG. 4(b) shows the first feature data. In FIG. 4(b), the scale of the vertical axis is enlarged as compared with that in FIG. 4(a). In FIG. 4(a), it is understood that the first feature data changes sharply in a step shape in each of edge portions (portions A, B, C and the like in the figure) of the one-dimensional original data (original image). In the portions other than the edge portions, the first feature data averages the one-dimensional original data and changes smoothly. Consequently, the edges and contrast of the original image are kept well and texture components other than the edges and contrast are removed.

In another method for extracting the first feature information, the first feature information extracting means 6 may use a data series as the first feature data $G_1'$. The data series is obtained by approximating the one-dimensional original data $G_1$ by a step function which is divided into intervals so that the value $\{g_i': i=p_k, P_k+1, \ldots, p_k+l_k-1\}$ of the first feature data $G_1'$ in each interval k is an average value $c_k$ in the interval of the one-dimensional original data, and the cumulative square error E between the one-dimensional original data $G_1$ and the first feature data $G_1'$ in all of intervals $\{k: k=1, 2, \ldots, M\}$ becomes the minimum.

$$E = \sum_{k=1}^{M} e(p_k, l_k) = \sum_{k=1}^{M} \sum_{i=p_k}^{p_k+l_k-1} (g_i - c_k)^2 \quad (4)$$

Since redundancy of the first feature data $G_1'$ generated in such a manner increases as compared with that of the one-dimensional original data $G_1$, the first feature data $G_1'$ can be compressed at high coding efficiency. The first coding means 7 entropy-codes the first feature data $G_1'$ (S4) and outputs the resultant data as first feature coded data (S5). To the first feature coded data, marker codes such as an image start code (SOF), a definition parameter group (DP) used for coding in the first coding means, and an end-of-image (EOI) code are also added. The codes are necessary at the time of decompressing the first feature coded data.

On the other hand, the second feature data generating means 11 generates one-dimensional second feature data $G_2'=\{f_i=g_i-g_i': i=1, 2, \ldots, S\}$ as the difference between the one-dimensional original data $G_1$ and the first feature data $G_1'$ (S6), and the second feature image decompressing means 12 decompresses the one-dimensional second feature data $G_2'$ to two-dimensional or three-dimensional second feature image $G_2$ by pseudo-Hilbert scan (S7). The orthogonal transforming means 16 divides the second feature image $G_2$ to partial second feature images of $M_0$ rows×$N_0$ columns $\{f_{p,q}(i, j):p=1, \ldots, L, q=1, \ldots, C, i=1, 2, \ldots, M_0, j=1, 2, \ldots, N_0\}$ (S8). Herein, p denotes a subscript showing the position of the partial second feature image in the row direction in the second feature image $G_2$, q denotes a subscript showing the position of the partial second feature image in the column direction in the second feature image $G_2$, i denotes a subscript showing the position of a pixel in the row direction in the partial second feature image $f_{p,q}$, and j denotes a subscript showing the position of a pixel in the column direction in the partial second feature image $f_{p,q}$. In the case where the second feature image $G_2$ is two-dimensional, it is assumed that the second feature image $G_2$ is divided into L parts in the row direction and C parts in the column direction. In the case where the second feature image $G_2$ is three-dimensional, it is assumed that the second feature image $G_2$ is divided into two-dimensional images $G_2(t)$ every image frames having the same time coordinate t, and the image in each image frame $G_2(t)$ is divided into L parts in the row direction and the C parts in the column direction. Usually, the size of the partial second feature image $\{f_{p,q}(i, j)\}$ is $M_0=8$ pixels by $N_0=8$ pixels.

The orthogonal transforming means 16 obtains a base vector $\{a_k(i, j): k=1 \ldots, M_0 \times N_0\}$ from the base vector table stored in the base vector storing means 15, and calculates an inner product $b_{p,q,k}$ between each base vector $a_k(i, j)$ and the partial second feature image $f_{p,q}(i, j)$ (S9). By the operations, the partial second feature image $f_{p,q}(i, j)$ is developed to a space constructed by base vectors featured by the base vector $\{a_k(i, j)\}$. The base vector $\{a_k(i, j)\}$ is a base vector used in the case of orthogonally transforming the partial second feature image $\{f_{p,q}(i, j)\}$ and, as the orthogonal transformation, KL transformation, DCT, DST or the like is used. The inner product $b_{p,q,k}$ is given by the following expression:

$$b_{p,q,k} = \sum_{i=1}^{M_0} \sum_{j=1}^{N_0} f_{p,q}(i, j) a_k(i, j) \quad (5)$$

(where $f_{p,q}$ and $a_k$ denote vectors of the "$M_0 \times N_0$"th order). The inner product serves as a coordinate value of the partial second feature image $\{f_{p,q}(i, j)\}$ in the space constructed by the base vectors.

The orthogonal transforming means 16 does not calculate the inner products of all of the base vectors $a_k(i, j)$, but outputs the inner product of only a base vector $a_k(i, j)$ at which a natural component of the partial second feature image $f_{p,q}(i, j)$ becomes significant. A set of eigenvectors $\{a_k(i, j): k=1, \ldots, m, m<M_0 \times N_0\}$ corresponding to the most effective base components in orthogonal transformation of the partial second feature image $f_{p,q}(i, j)$ is determined in advance by using a plurality of test patterns and is stored as the base vector $\{a_k(i, j)\}$ in the base vector storing means 15. At this time, in order of base components capable of accurately expressing the pattern of the partial second feature image $f_{p,q}(i, j)$ from the highest capability, the base vectors are arranged like $a_1(i, j), a_2(i, j), \ldots,$ and $a_m(i, j)$. The determining means 13 determines the number "m" of sets of base vectors used for calculation of an inner product by referring to the determination table on the basis of the value of the cumulative error $\{e(p_k, l_k): k=1, 2, \ldots, M\}$ stored in the cumulative error memory 10. The orthogonal transforming means 16 calculates and outputs a natural value of only the set $\{a_1(i, j), a_2(i, j), \ldots, a_m(i, j)\}$ of base vectors of the number determined by the determining means 13 and outputs zero for the other natural values. In such a manner, the orthogonal transforming means 16 does not always have to execute the inner product calculation of $M_0 \times N_0$ times, but may execute the inner product calculation of m times on the effective characteristic axis. Thus, the calculation amount is reduced and the information compressing process can be performed at higher speed.

In the case where the high speed performance of the information compressing process is not requested so much, the orthogonal transforming means 16 may execute the inner product calculation with respect to all of sets of base vectors $\{a_k(i, j)\}$, output the calculation result only when the inner product is equal to or more than a predetermined threshold $\beta$, and output zero in the other cases.

As described above, in this embodiment, with respect to the base vectors $\{a_k(i, j)\}$, calculation is not performed for each partial second feature image, but the set $\{a_k(i, j): k=1, \ldots, m\}$ of base vectors stored in the base vector storing means 15 is used, so that it is unnecessary to consider calculation time of the natural values and base vectors at the time of the image information compressing process. Therefore, it is possible to preliminarily determine the set of optimum base vectors $\{a_k(i, j): k=1, \ldots, m\}$ by using a plurality of test patterns by KL transformation capable of expressing the pattern of the partial second feature image $f_{p,q}(i, j)$ most accurately among the orthogonal transformations. The orthogonal transforming means 16 can calculate an inner product by using the set of base vectors $\{a_k(i, j): k=1, \ldots, m\}$. By using the KL transformation, as compared with the conventional case of using DCT, the coding efficiency can be increased.

When the inner product set $\{b_{p,q,k}\}$ is output by the orthogonal transforming means 16, the second coding means 9 codes the inner product set $\{b_{p,q,k}\}$ (S10) and outputs the resultant as second feature coded data (S11). In coding, data is quantized by the quantizing unit 17 and, after that, the quantized data is entropy-coded by the entropy coding unit 18, thereby performing information compression. The second feature coded data includes marker codes such as the image start code (SOF), the definition parameter group (DP) used for coding in the first coding means, and the end-of-image (EOI) code. To the definition parameter group, the set $\{a_k(i, j): k=1, \ldots, m\}$ of base vectors used for orthogonal transformation is also added because it is needed at the time of decoding the second feature coded data.

As described above, the partial second feature image is subjected to orthogonal-transformation and only the inner product on the feature axis is coded, thereby obtaining the second feature coded data, so that high coding efficiency can be obtained.

A method of decompressing an original image from the first feature coded data and the second feature coded data will now be described.

Figure 5:
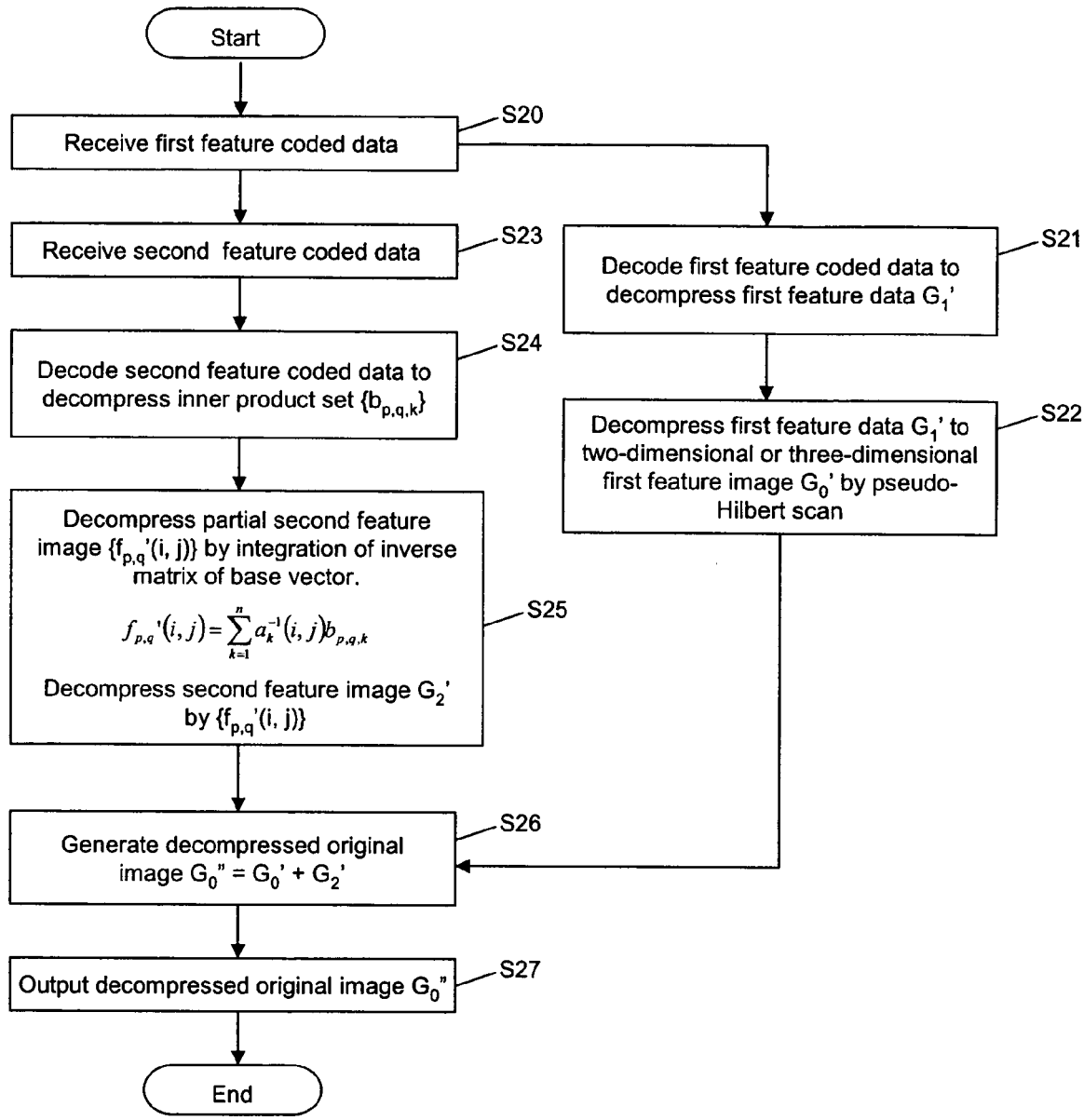
FIG. 5 is a flowchart showing a method of decompressing an original image from hierarchical data coded by the image information compressing method in Embodiment 1.

FIG. 5 is a flowchart showing a method of decompressing an original image from hierarchical data coded by the image information compressing method in Embodiment 1.

First, when the first feature coded data transmitted from the first coding means 7 is received (S20), the first decoding means 19 decodes a coded image included in the first feature coded data, thereby decompressing the first feature data $G_1'$ (S21). The first feature image decompressing means 20 decompresses the two-dimensional or three-dimensional first feature image $G_0'$ by filling a two-dimensional or three-dimensional space with the first feature data $G_1'$ by pseudo-Hilbert scan (S22).

On the other hand, when the second feature coded data transmitted from the second coding means 9 is received (S23), the second decoding means 21 decodes the coded image included in the second feature coded data, thereby decompressing the inner product set $\{b_{p,q,k}\}$ (S24). At this time, the set of base vectors $\{a_k(i, j): k=1, \ldots, m\}$ used for orthogonal transformation is obtained from the definition parameter group included in the second feature coded data. Subsequently, the second feature image decompressing means 22 decompresses the partial second feature image $\{f_{p,q}'(i, j)\}$ and decompresses the second feature image $G_2''$ from the decompressed partial second feature image $\{f_{p,q}(i, j)\}$ (S25).

Since the inner product set $\{b_{p,q,k}\}$ is expressed by the equation (5), the partial second feature image $\{f_{p,q}'(i, j)\}$ is decompressed by the following arithmetic operation:

$$f_{p,q}(i, j) = \sum_{k=1}^{M_0 \times N_0} a_k^{-1}(i, j) b_{p,q,k} \quad (6)$$

Herein, the vector $a_k^{-1}$ of the "$M_0 \times N_0$"th order is a reverse vector of the base vector $a_k$.

Since a non-effective component of the inner product set $\{b_{p,q,k}\}$ is approximated by zero, the decompressed second feature image $G_2''$ does not perfectly coincide with the original second feature image $G_2$, but is well approximated.

The original image decompressing means 23 decompresses an original image $G_0''$ by adding the first feature image $G_0'$ and the decompressed second feature image $G_2''$ (S26). The decompressed original image $G_0''$ is stored in the image memory 24 and output to the outputting means 25 such as a display (S27).

As described above, in the case of decoding original image data obtained by feature extraction and coding to generate a decompressed image, the decompression can be performed at high speed by simple matrix calculation.

EMBODIMENT 2

Figure 6:
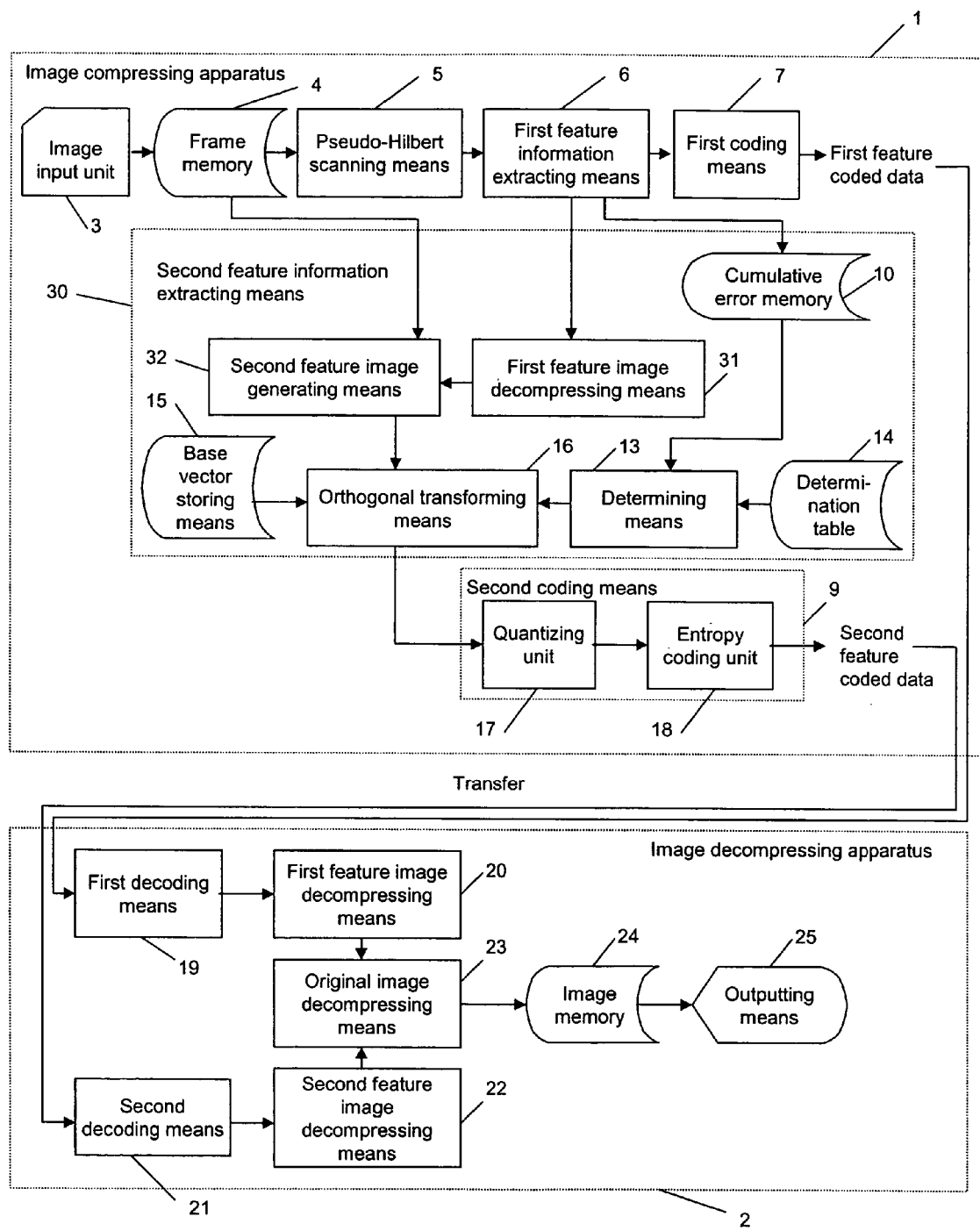
FIG. 6 is a block diagram of an image information compressing apparatus and an image decompressing apparatus according to Embodiment 2 of the present invention.

FIG. 6 is a block diagram of an image information compressing apparatus and an image decompressing apparatus according to Embodiment 2 of the present invention.

Shown in FIG. 6 are the image compressing apparatus 1, the image decompressing apparatus 2, the image input unit 3, the frame memory 4, the pseudo-Hilbert scanning means 5, the first feature information extracting means 6, the first coding means 7, the second coding means 9, the cumulative error memory 10, the determining means 13, the determination table 14, the base vector storing means 15, the orthogonal transforming means 16, the quantizing unit 17, the entropy coding unit 18, the first decoding means 19, the first feature image decompressing means 20, the second decoding means 21, the second feature image decompressing means 22, the original image decompressing means 23, the image memory 24, and the outputting means 25. Those components are similar to those in FIG. 1, so that the same reference numerals are designated and their description will not be repeated.

In this embodiment, a second feature information extracting means 30 is characterized by having a first feature image decompressing means 31 and a second feature image generating means 32. When the first feature information extracting means 6 generates the first feature data $G_1'$, the first feature image decompressing means 31 fills a two-dimensional or three-dimensional space with the first feature data $G_1'$ by pseudo-Hilbert scan to decompress the first feature data $G_1'$ to the first feature image $G_0'$. The second feature image generating means 32 calculates the difference between the original image $G_0$ and the first feature image $G_0'$, thereby generating a second feature image $G_2 = G_0 - G_0'$. The second feature image $G_2$ obtained in such a manner is compressed and coded by the orthogonal transforming means 16 and the second coding means 9.

EMBODIMENT 3

Figure 7:
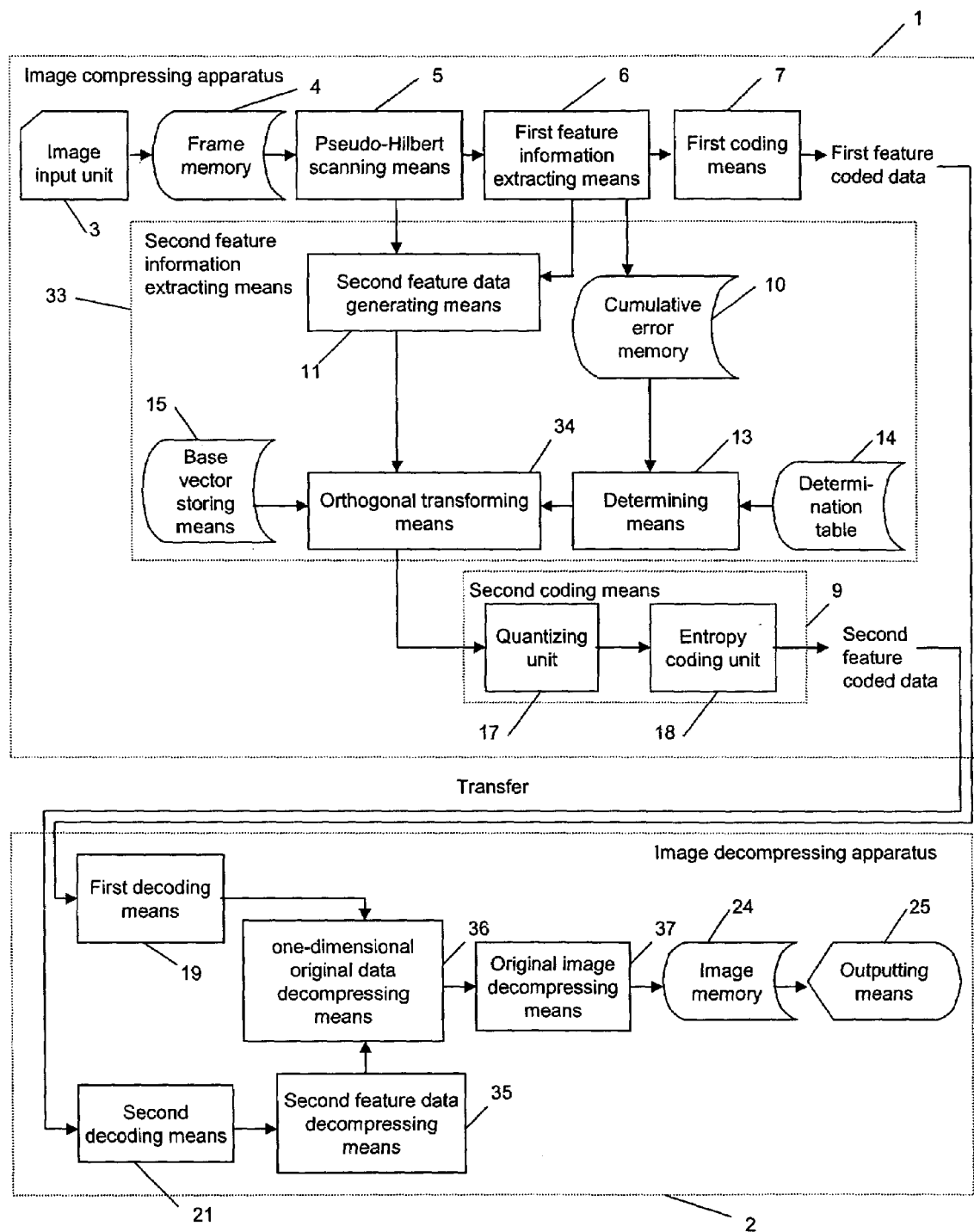
FIG. 7 is a block diagram of an image information compressing apparatus and an image decompressing apparatus according to Embodiment 3 of the present invention.

FIG. 7 is a block diagram of an image information compressing apparatus and an image decompressing apparatus according to Embodiment 3 of the present invention.

Shown in FIG. 7 are the image compressing apparatus 1, the image decompressing apparatus 2, the image input unit 3, the frame memory 4, the pseudo-Hilbert scanning means 5, the first feature information extracting means 6, the first coding means 7, the second coding means 9, the cumulative error memory 10, the second feature data generating means 11, the determining means 13, the determination table 14, the base vector storing means 15, the quantizing unit 17, the entropy coding unit 18, the first decoding means 19, the second decoding means 21, the image memory 24, and the outputting means 25. Those components are similar to those in FIG. 1, so that the same reference numerals are designated and their description will not be repeated.

In this embodiment, a second feature information extracting means 33 is characterized by having an orthogonal transforming means 34 for coding a second feature data component value of a predetermined base vector in a space constructed by base vectors, thereby obtaining second feature coded data. The image decompressing apparatus 2 has a second feature data decompressing means 35, a one-dimensional original data decompressing means 36, and an original image decompressing means 37.

An image information compressing method of this embodiment will be described below with reference to the flowchart of FIG. 8.

Figure 8:
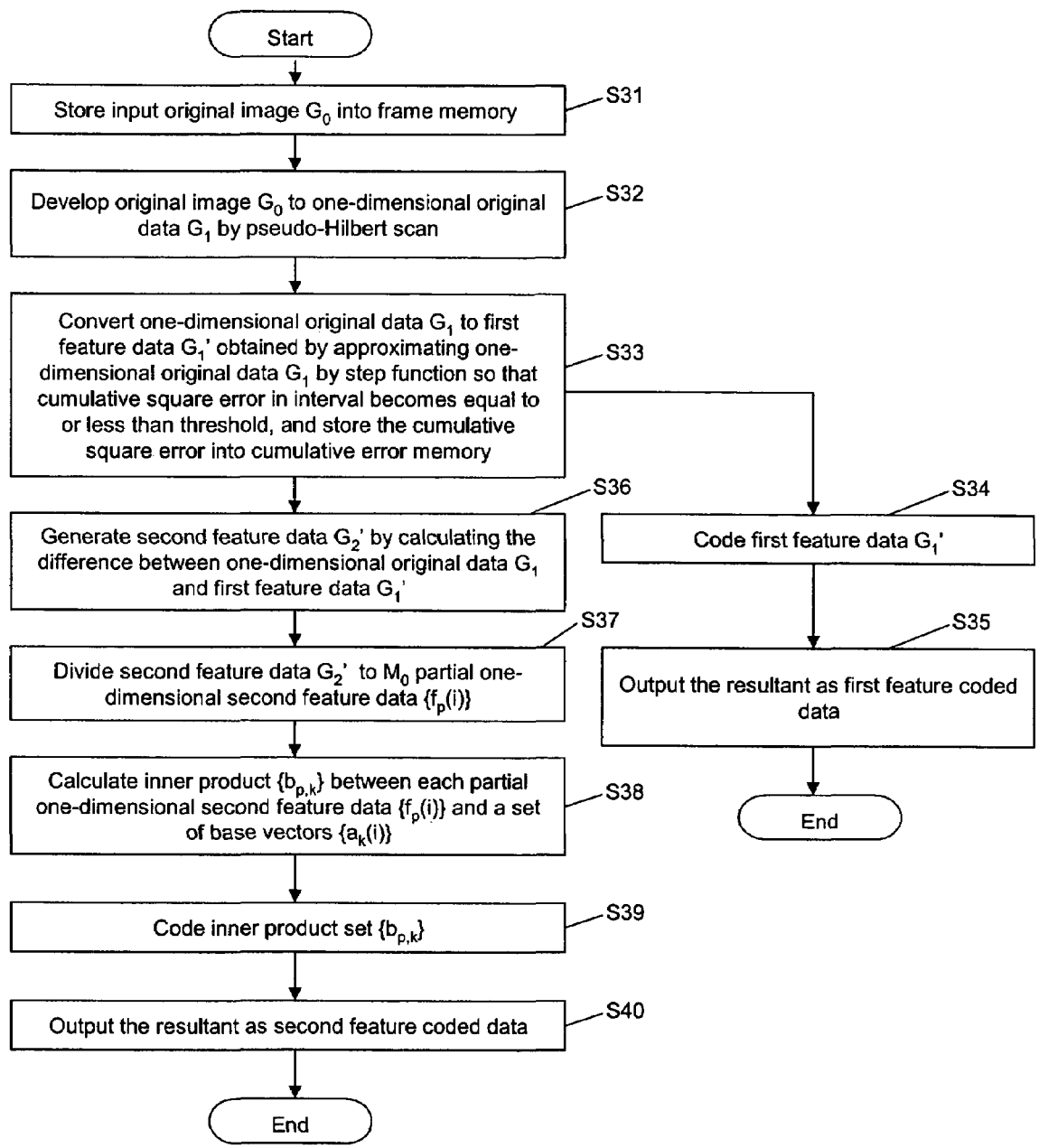
FIG. 8 is a flowchart showing an image information compressing method according to Embodiment 3 of the present invention.

FIG. 8 is a flowchart showing an image information compressing method according to Embodiment 3 of the present invention.

In FIG. 8, operations in S31 to S36 are similar to those in S1 to S6 in FIG. 2, respectively, so that they will not be described here.

In this embodiment, when the second feature data generating means 11 generates one-dimensional second feature data $G_2' = \{f_i = g_i - g_i': i=1, 2, \ldots, S\}$ (S36), the orthogonal transforming means 34 divides the one-dimensional second feature data $G_2'$ to $N_0$ sets of partial one-dimensional second feature data $\{f_p(i): i=1, \ldots, M_0, p=1, \ldots, N_0\}$ made of $M_0$ data series (S37). Generally, 64 pixels are used as the value of $M_0$. In the base vector storing means 15, a base vector table as a collection of base vectors used at the time of orthogonally transforming one-dimensional second feature data is stored. The orthogonal transforming means 34 obtains a base vector $\{a_k(i): k=1, \ldots, M_0\}$ from the base vector table stored in the base vector storing means 15, and calculates an inner product $b_{p,k}$ between each base vector $a_k(i, j)$ and the partial one-dimensional second feature data $f_p(i)$ (S38). That is, in this embodiment, the inner product $b_{p,k}$ is given by the following:

$$b_{p,k} = \sum_{i=1}^{M_0} f_p(i) a_k(i) \qquad (7)$$

At this time, the orthogonal transforming means 34 does not output the inner products of all of the base vectors $a_k(i)$, but outputs the inner product of only a base vector $a_k(i)$ at which a natural component of the partial one-dimensional second feature data $f_p(i)$ becomes significant. A set of base vectors $\{a_k(i): k=1, \ldots, m, m<M_0\}$ corresponding to the most effective feature axis in orthogonal transformation of the partial one-dimensional second feature data $f_p(i)$ is determined in advance by using a plurality of test patterns and is stored in the base vector storing means 15. At this time, in order of axes capable of accurately expressing the pattern of the partial one-dimensional second feature data $f_p(i)$ from the highest capability, the base vectors are arranged like $a_1(i), a_2(i), \ldots,$ and $a_m(i)$. The determining means 13 determines the number "m" of sets of base vectors used for calculation of an inner product by referring to the value of the cumulative square error $\{e(p_k, 1_k): k=1, 2, \ldots, M\}$ stored in the cumulative error memory 10. The orthogonal transforming means 34 calculates and outputs an inner product value of only the set $\{a_1(i), a_2(i), \ldots, a_m(i)\}$ of base vectors of the number determined by the determining means 13, and outputs zero for the other base vectors. In such a manner, the orthogonal transforming means 34 does not always have to execute the inner product calculation of $M_0$ times, but may execute the inner product calculation of m times on the effective base vectors. Thus, the calculation amount is reduced and the information compressing process can be performed at higher speed.

Further, in this embodiment, without decompressing a two-dimensional or three-dimensional second feature image before the inner product calculation, the inner product between the one-dimensional second feature data $G_2'$ as it is and the base vector $\{a_k(i)\}$ is calculated, compressed, and coded. Thus, the calculation amount is small and the method is suited particularly to the case where high speed is requested.

A set $\{b_{p,k}\}$ of inner products output from the orthogonal transforming means 34 is quantized and entropy-coded by the second coding means 9 (S39) and the resultant is output as the second feature coded data (S40).

A method of decompressing an original image from the first feature coded data and the second feature coded data will now be described.

Figure 9:
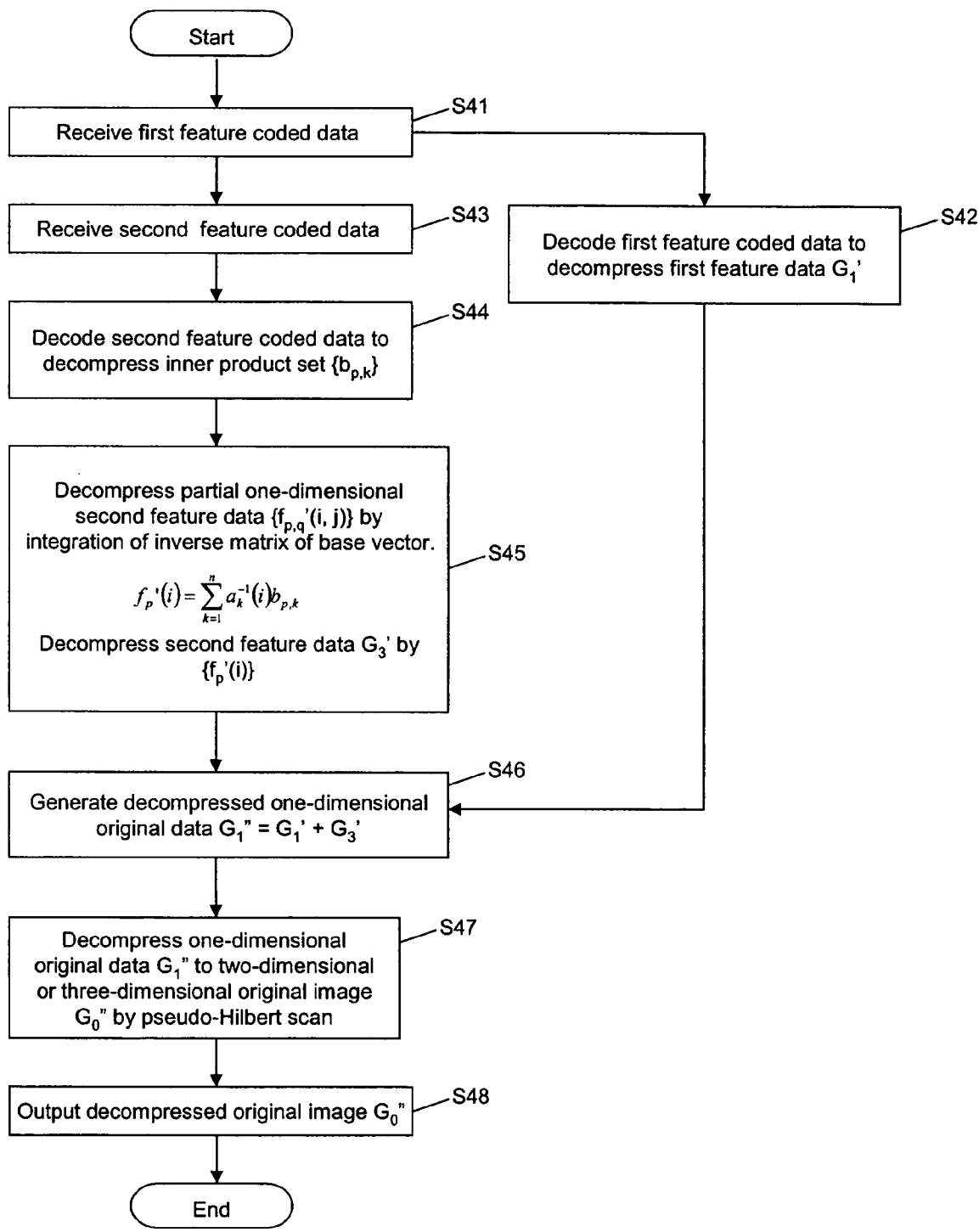
FIG. 9 is a flowchart showing a method of decompressing an original image from hierarchical data coded by the image information compressing method in Embodiment 3.

FIG. 9 is a flowchart showing a method of decompressing an original image from hierarchical data coded by the image information compressing method in Embodiment 3.

First, the first decoding means 19 receives first feature coded data transmitted from the first coding means 7 (S41) and decodes a coded image included in the first feature coded data, thereby decompressing the first feature data $G_1'$ (S42).

On the other hand, the second decoding means 21 receives second feature coded data transmitted from the second coding means 9 (S43) and decodes a coded image included in the second feature coded data, thereby decompressing an inner product set $\{b_{p,k}\}$ (S44). A set $\{a_k(i): k=1, \ldots, m\}$ of base vectors used for orthogonal transformation is obtained from a definition parameter group included in the second feature coded data. Subsequently, a one-dimensional second feature data decompressing means 35 decompresses partial one-dimensional second feature data $\{f_p'(i)\}$ and, from the decompressed partial one-dimensional second feature data $\{f_p'(i)\}$, decompresses one-dimensional second feature data $G_3'$ (S45).

Since the inner product set $\{b_{p,k}\}$ is expressed by the equation (7), the one-dimensional second feature data $\{f_p'(i)\}$ is decompressed by the following arithmetic operation:

$$f_p'(i) = \sum_{k=1}^{M_0} a_k^{-1}(i) b_{p,k} \qquad (8)$$

Herein, the vector $a_k^{-1}$ of the "$M_0$"th order is a reverse vector of the base vector $a_k$.

Since a non-effective component of the inner product set $\{b_{p,k}\}$ is approximated by zero, the decompressed one-dimensional second feature data $G_3'$ does not perfectly coincide with the one-dimensional second feature data $G_3$, but is well approximated.

The one-dimensional original data decompressing means 36 decompresses one-dimensional original data $G_1''$ by adding the first feature data $G_1'$ and the decompressed one-dimensional second feature data $G_3'$ (S46), and the original image decompressing means 37 decompresses a two-dimensional or three-dimensional original image $G_0''$ by filling a two-dimensional or three-dimensional space with the one-dimensional original data $G_1''$ by pseudo-Hilbert scan (S47). The decompressed original image $G_0''$ is stored in the image memory 24 and output to the outputting means 25 such as a display (S48).

EMBODIMENT 4

Figure 10:
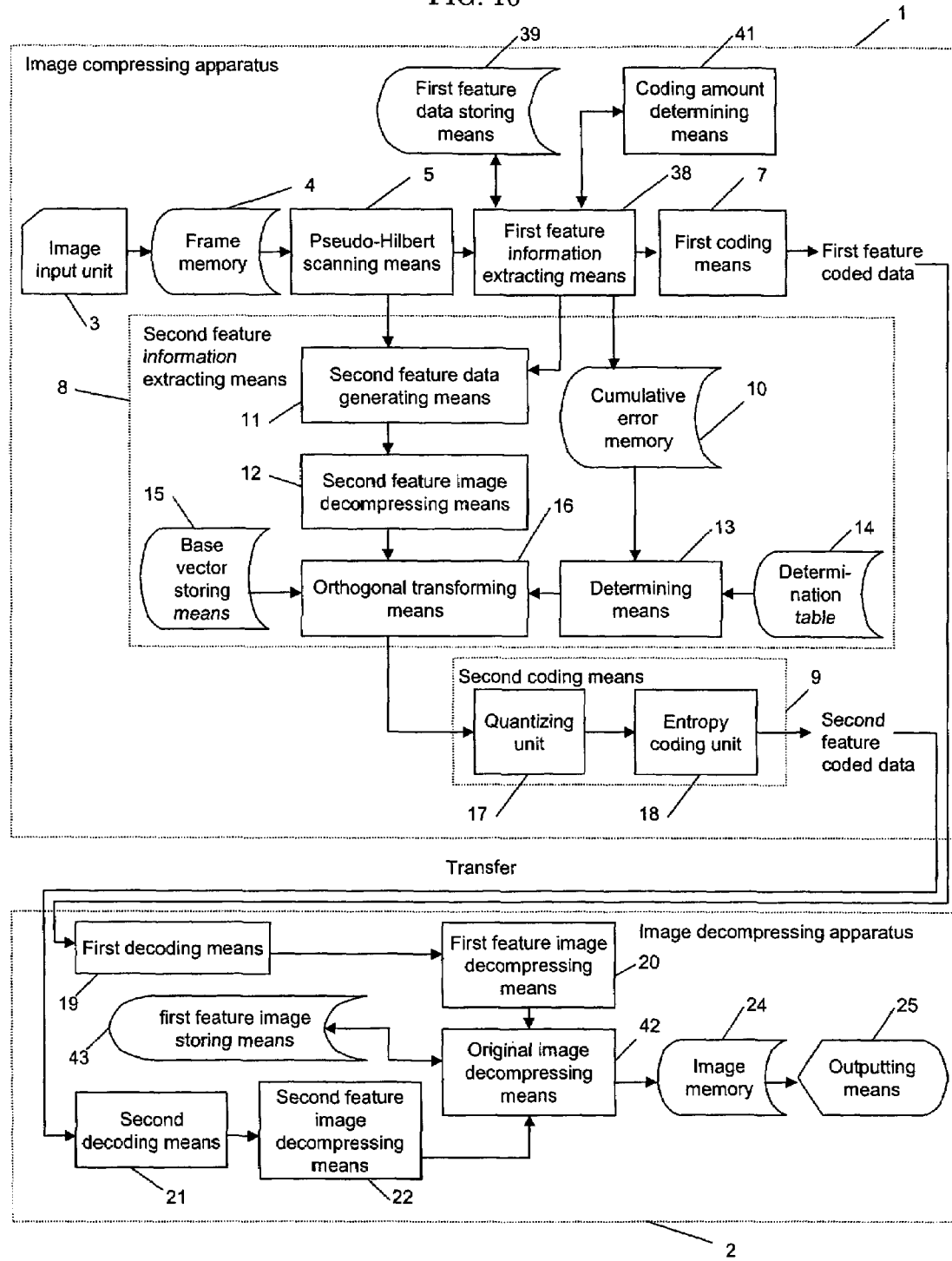
FIG. 10 is a block diagram of an image information compressing apparatus and an image decompressing apparatus according to Embodiment 4 of the present invention.

FIG. 10 is a block diagram of an image information compressing apparatus and an image decompressing apparatus according to Embodiment 4 of the present invention.

Shown in FIG. 10 are the image compressing apparatus 1, the image decompressing apparatus 2, the image input unit 3, the frame memory 4, the pseudo-Hilbert scanning means 5, the first coding means 7, the second feature information extracting means 8, the second coding means 9, the cumulative error memory 10, the second feature data generating means 11, the second feature image decompressing means 12, the determining means 13, the determination table 14, the base vector storing means 15, the orthogonal transforming means 16, the quantizing unit 17, the entropy coding unit 18, the first decoding means 19, the first feature image decompressing means 20, the second decoding means 21, the second feature image decompressing means 22, the image memory 24, and the outputting means 25. Those components are similar to those in FIG. 1, so that the same reference numerals are designated and their description will not be repeated.

In this embodiment, it is assumed that an original image input from the image input unit 3 is a moving image constructed by a series of plural frames continuous in the time base direction. For a predetermined frame, a first feature information extracting means 38 extracts first feature information by generating first feature data by approximating one-dimensional original data by a predetermined function having redundancy larger than that of the one-dimensional original data, and stores the first feature data into a first feature data storing means 39. On the other hand, for the other frames, the first feature information extracting means 38 generates first difference data obtained by subtracting the first feature data in a past frame stored in the first feature data storing means 39 from the one-dimensional original data, and generates first feature data by approximating the first difference data by a predetermined function having redundancy larger than that of the first difference data, thereby extracting first feature information.

The first coding means 7 generates first feature coded data by entropy-coding the first feature data. A coding amount determining means 41 calculates a coding amount of the first feature coded data and determines whether the coding amount exceeds a predetermined threshold or not.

The image decompressing apparatus 2 has an original image decompressing means 42 and a first feature image storing means 43. The original image decompressing means 42 generates a decompressed image by adding the first feature image generated by the first feature image decompressing means 20 and the second feature image generated by the second feature image decompressing means 22. In the case where the decompressed image is a decompressed original image, the original image decompressing means 42 outputs the decompressed image as a decompressed original image to the image memory 24 and stores the first feature image into the first feature image storing means 43. On the other hand, in the case where the decompressed image is not a decompressed original image, the original image decompressing means 42 adds the first feature image stored in the first feature image storing means 43 and the decompressed image, thereby obtaining a decompressed original image, and outputs the decompressed original image to the image memory 24.

An image compressing method of the image compressing apparatus of this embodiment constructed as described above will be described below with reference to the flowchart of FIG. 11.

Figure 11:
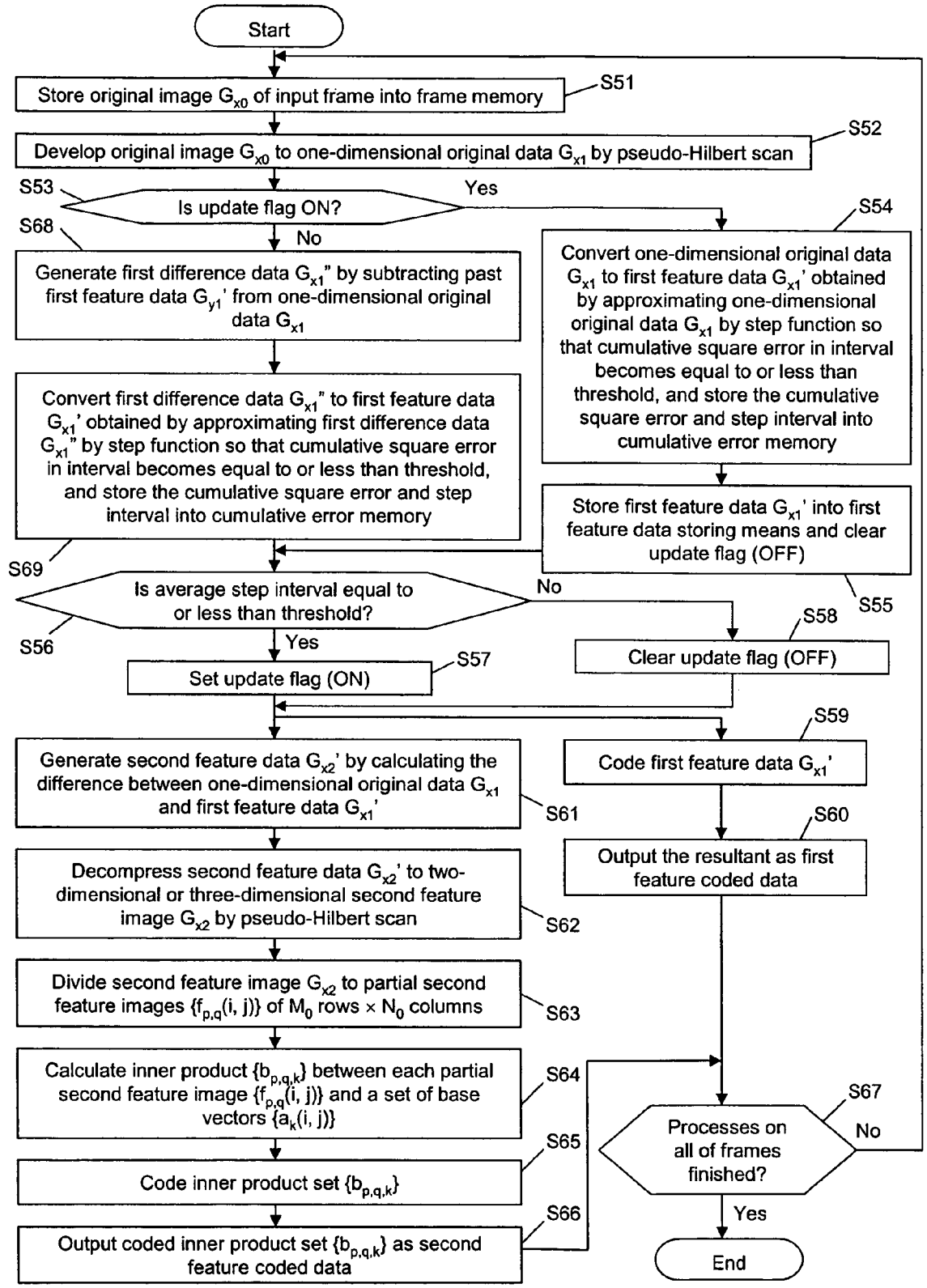
FIG. 11 is a flowchart showing an image information compressing method according to Embodiment 4 of the present invention.

FIG. 11 is a flowchart showing the image information compressing method according to Embodiment 4 of the present invention.

First, when a moving image made by a plurality of frames is input from the image input unit 3, the moving image is stored into the frame memory 4 (S51). It is assumed herein that an original image $G_{x0}$ of a frame is stored in the frame memory. Herein, x (x=1, 2, 3, . . .) is a subscript showing the number of the frame. The pseudo-Hilbert scanning means 5 converts the original image $G_{x0}$ into one-dimensional original data $G_{x1}$ by pseudo-Hilbert scan (S52). Next, the first feature information extracting means 38 refers to an update flag held as an internal variable. The "update flag" is a flag for determining whether first feature data stored in the first feature data storing means 39 is to be updated or not. In the case where the flag is in an ON state, the first feature data stored in the first feature data storing means 39 is updated.

In an initial state, the update flag is set in the ON state. The first feature information extracting means 38 converts the first frame (frame of x=1) to first feature data $G_{x1}'$ by approximating one-dimensional original data $G_{x1}$ by a step function which changes step by step every predetermined interval, and stores cumulative square error $e(p_k, l_k)$ into the cumulative error memory 10 (S54). The first feature information extracting means 38 also calculates the number $n_s$ of steps of the first feature data $G_{x1}'$ and an average value of step intervals (average step interval) $d=S/n_s$ (see FIG. 4(a)) or step density $\rho=n_s/S$. Herein, S denotes the size of the original image $G_{x0}$ (total number of pixels of the original image $G_{x0}$). The first feature information extracting means 38 stores the first feature data $G_{x1}'$ into the first feature data storing means 39 and clears the update flag (S55). Since the operation of the first feature information extracting means 38 in step S54 is similar to that in step S3 in Embodiment 1, its detailed description will not be repeated.

Next, when the average step interval "d" is equal to or less than a predetermined threshold $\Gamma d$ or when the step density $\rho$ is equal to or more than a predetermined threshold $\Gamma_\rho$ (S56), the coding amount determining means 41 sets the update flag into the ON state (S57). This is an operation for updating the first feature data stored in the first feature data storing means 39 in the case where correlation in the time direction of images is lost or in the case where the correlation between a present frame image and a frame image in the past becomes low due to a change in a scene of a moving image or the like. The details of the operation will be described later.

On the other hand, in step S56, when the average step interval "d" is larger than the predetermined threshold $\Gamma_d$ or when the step density $\rho$ is smaller than the predetermined threshold $\Gamma_\rho$, the coding amount determining means 41 clears the update flag (S58).

The first coding means 7 codes the first feature data $G_{x1}'$ by entropy coding (S59) and outputs the resultant data as first feature coded data (S60). In order to enable the first feature coded data to be decompressed, a marker code indicating that the first feature coded data is data obtained by coding the one-dimensional original data is added.

The second feature information extracting means 8 and the second coding means 9 encode second feature data $G_{x2}'$ as a remainder of subtraction of the first feature data $G_{x1}'$ from the one-dimensional original data $G_{x1}$ and output the resultant as second feature coded data (S61 to S66). Since the operation is similar to that in steps S6 to S11 in Embodiment 1, its description will not be repeated.

In the case where the image information compressing process on all of frames has not been finished (S67), the program returns to step S51.

In step S53, when the update flag is in the OFF state, the first feature information extracting means 38 obtains the past first feature data $G_{y1}'$ (y<x) stored in the first feature data storing means 39 and generates first difference data $G_{x1}''$ by subtracting the past first feature data $G_{y1}'$ from the one-dimensional original data $G_{x1}$ (S68). The first feature information extracting means 38 converts the first difference data $G_{x1}''$ to first feature data $G_{x1}'$ obtained by approximation with a step function which changes step by step every predetermined interval and stores the cumulative square error $e(p_k, l_k)$ into the cumulative error memory 10 (S69).

As described above, by coding the first difference data $G_{x1}''$ obtained by subtracting the past first feature data $G_{y1}'$ from the one-dimensional original data $G_{x1}$ without directly decoding the one-dimensional original data $G_{x1}$, the first feature information of which change in the time direction is small is subtracted and redundancy in the time direction can be eliminated efficiently. As a result, higher coding efficiency on the first feature information can be obtained.

As time elapses, the correlation between frames in the time direction decreases. In association with the decrease, the information amount of the first feature information in the first difference data $G_{x1}''$ increases. Consequently, at the time point when the information amount of the first feature information increases to a certain extent in the first difference data $G_{x1}''$, it becomes necessary to update the past first feature data $G_{y1}'$ (y<x) stored in the first feature data storing means 39. In steps S56 to S58, the average step interval "d" or step density $\rho$ is monitored by the coding amount determining means 41. When the average step interval "d" becomes equal to or less than a predetermined threshold $\Gamma_d$ or when the step density $\rho$ becomes equal to or more than a predetermined threshold $\Gamma_\rho$, the coding amount determining means 41 determines that the correlation between frames in the time direction decreases, sets the update flag to the ON state, and updates the past first feature data $G_{y1}'$ (y<x) stored in the first feature data storing means 39. In such a manner, redundancy in the time direction can be efficiently removed in coding of the first feature information.

In this embodiment, the coding amount determining means 41 determines whether the original image $G_0$ of the present frame has correlation with an original image of a past frame or not by comparing the average step interval "d" or step density p with the threshold $\Gamma_d$ or $\Gamma_\rho$ and switches the update flag (steps S56 to S58). However, determination of whether the original image $G_0$ of the present frame has correlation with an original image of a past frame or not is not limited to the method. For example, the determination can be also made by checking whether a coding amount Q of the first feature data $G_{x1}'$ exceeds a threshold $\Gamma_Q$ or not. Specifically, in place of steps S56 to S58, after step S60, the coding amount determining means 41 calculates the coding amount Q of the first feature data $G_{x1}'$ and determines whether the coding amount Q exceeds the threshold $\Gamma Q$ or not. In the case where the coding amount Q exceeds the predetermined threshold $\Gamma_Q$, the update flag is set in the ON state.

In step S57, first, the coding amount determining means 41 determines whether the present update flag is in the ON state or the OFF state. In the case of the OFF state, the coding amount determining means 41 simply sets the update flag into the ON state. On the other hand, in the case of the ON state, the first feature information extracting means 38 is allowed to perform operations in steps S54 and S55 and, after that, the update flag is set to the ON state. Specifically, the first difference data $G_{x1}''$ is approximated to generate the first feature data $G_{x1}'$ in S69. When the average step interval "d" of the first feature data $G_{x1}'$ is equal to or less than the predetermined threshold $\Gamma_d$ or when the step density ρ is equal to or more than the predetermined threshold $\Gamma_\rho$, the correlation between the original image $G_0$ of the present frame and an original image of a past frame stored in the first feature data storing means 39 is low. Consequently, if the first difference data $G_{x1}''$ is approximated to generate the first feature data $G_{x1}'$, the coding efficiency is low. In such a case, it is also possible to approximate the one-dimensional original data $G_{x1}$ again to generate the first feature data $G_{x1}'$.

A method of decompressing an original image from first feature coded data and second feature coded data will now be described.

Figure 12:
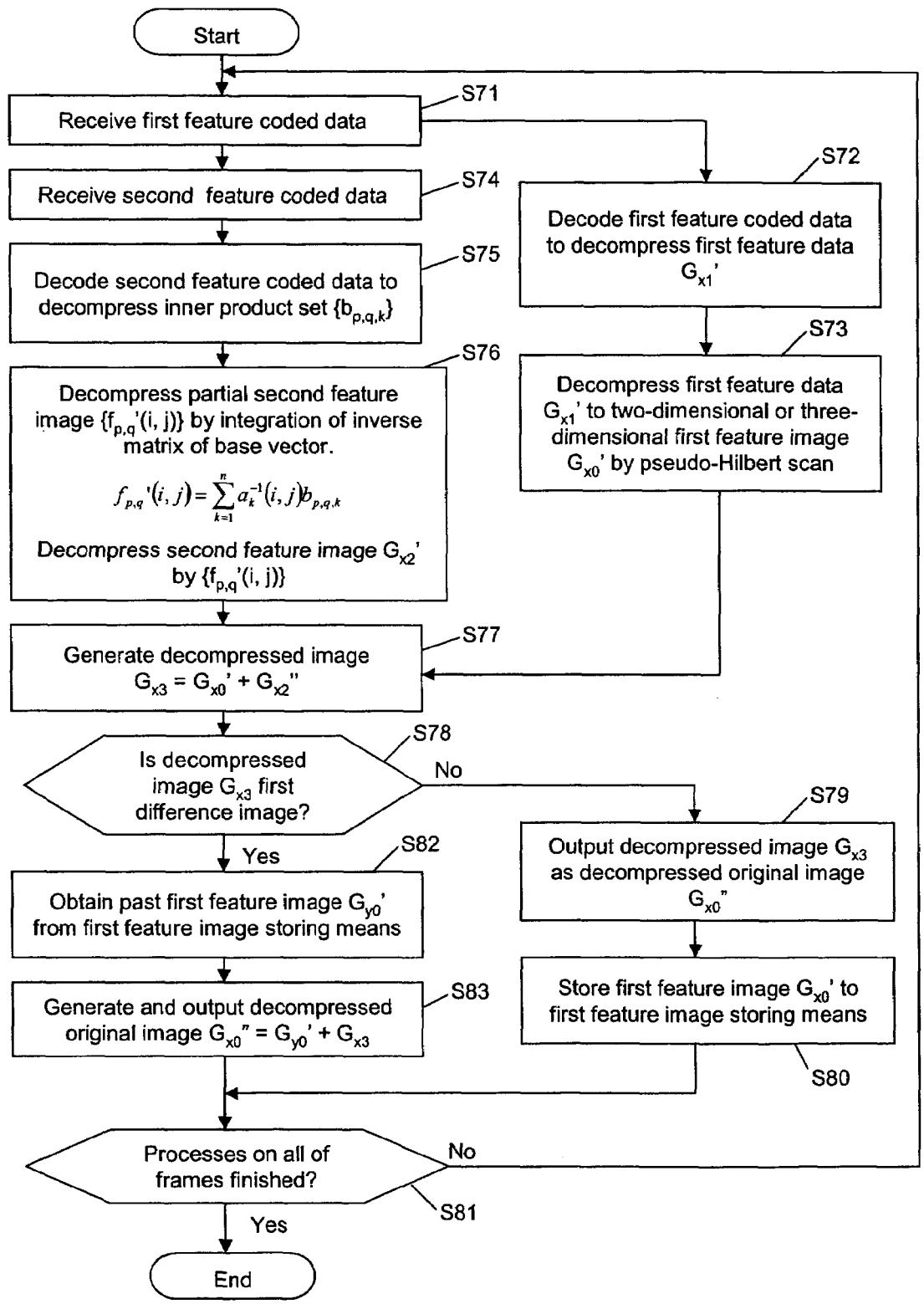
FIG. 12 is a flowchart showing a method of decompressing an original image from hierarchical data coded by the image information compressing method according to Embodiment 4.

FIG. 12 is a flowchart showing a method of decompressing an original image from hierarchical data coded by the image information compressing method in Embodiment 4.

In FIG. 12, operations in steps S71 to S77 are similar to those in steps S20 to S26 in FIG. 5 of Embodiment 1, so that their description will not be repeated here.

In step S77, the original image decompressing means 42 adds the decompressed first feature image $G_{x0}'$ and the decompressed second feature image $G_{x2}''$, thereby generating the decompressed image $G_{x3}$. Different from the case of Embodiment 1, the decompressed image $G_{x3}$ is subjected to the redundancy eliminating process in the time direction. Consequently, at the time of decompression, it is necessary to decompress the eliminated redundancy.

The original image decompressing means 42 checks whether a marker indicating that the data is one-dimensional original data is added to the first feature coded data or not. In the case where the marker is added (S78), the decompressed image $G_{x3}$ is stored as a decompressed original image $G_{x0}''$ into the image memory 24 (S79) and the decompressed first feature image $G_{x0}'$ is stored in the first feature image storing means 43 (S80). The decompressed original image $G_{x0}''$ stored in the image memory 24 is output to the outputting means 25 such as a display.

On the other hand, in the case where a marker indicating that the image is one-dimensional original data is not added to the first feature coded data (S78) the original image decompressing means 42 obtains the past first feature image $G_{y0}'$ (y<x) decompressed by the first feature image storing means 43 (S82), adds the first feature image $G_{y0}'$ and the decompressed image $G_{x3}$, thereby generating the decompressed original image $G_{x0}''$, and stores the decompressed original image $G_{x0}''$ into the image memory 24. The decompressed original image $G_{x0}''$ stored in the image memory 24 is output to the outputting means 25 such as a display.

Those processes are repeated until all of frames are processed (S81).

In the case of decoding the original image data subjected to feature extraction and coding to generate a decompressed image, the decompression can be performed at high speed by simple matrix calculation.

The image information compressing apparatus in each of the foregoing embodiments can be also realized by executing a program on a computer. Further, it is also possible to realize the image information compressing apparatus in each of the foregoing embodiments by recording the program onto a recording medium, loading the program recorded on the recording medium into a computer, and executing the program on the computer.

As described above, according to the present invention, at the time of converting a two-dimensional or three-dimensional original image to one-dimensional original data, the pseudo-Hilbert scan is used so that correlation of pixel data along the scan direction is high. Consequently, in the case of performing approximation by first feature data, a contrast component and an edge component included in an image can be effectively separated from texture components.

Therefore, dependency on an image pattern of an effective feature axis (base component) in the case of mapping a second feature image into a space constructed by base vectors is small. Without calculating a base vector for each compressed image, a base vector can be calculated in advance by using a test pattern, registered in a base vector table, and used by being referred to.

With respect to coordinate values of a second feature image in coordinate axes in the space constructed by the base vectors, only natural values to some base vectors are significant and the other natural values become almost zero. Therefore, by leaving only some base vectors having significant values and approximating the other data by zero, a second feature image can be compressed.

Thus, the high-speed image information compressing method of high coding efficiency can be provided.

INDUSTRIAL APPLICABILITY

As described above, the image information compressing method according to the present invention can effectively extract features from an image and can perform image information compression of high coding efficiency and with little deterioration in picture quality, is useful as a method of compressing image information in an apparatus for transmitting or storing image information such as a television telephone or a video camera, and is particularly suitable for use in an image processing apparatus in which high speed and high coding efficiency is requested.

We claim:

1. An image information compressing method of performing feature extraction and coding on an original image, comprising the steps of:
   converting a two-dimensional or three-dimensional original image into one-dimensional original data by pseudo-Hilbert scan;
   extracting first feature information by generating first feature data by approximating said one-dimensional original data by a step function which changes step by step every predetermined interval;
   coding said first feature information, thereby obtaining first feature coded data;
   extracting second feature information by subtracting said first feature information from said original image; and
   developing said second feature information to a space constructed by base vectors by using base vectors stored in a base vector table, and coding a part of a component value of said second feature information for a predetermined base vector in the space constructed by said base vectors, thereby obtaining second feature coded data, wherein
   the step function for approximating said one-dimensional original data is a step function in which a data value of said first feature data in each of said intervals is equal to an average value in the interval of said one-dimensional original data, and made by a series of data divided into said intervals so that a cumulative error in all of the intervals between said one-dimensional original data and said first feature data becomes the minimum or
   a step function in which a data value of said first feature data in each of said intervals is equal to an average value in the interval of said one-dimensional original data, and made by a series of data divided into said intervals so that a cumulative error in each of the intervals between said one-dimensional original data and said first feature data becomes equal to or less than a predetermined threshold.

2. The image information compressing method according to claim 1, wherein
   said original image is constructed by a series of plural frames which are continuous in a time direction,
   in the step of extracting said first feature information,
   with respect to a predetermined frame, first feature data is generated by approximating said one-dimensional original data by said step function, thereby extracting first feature information, and said first feature data is stored into first feature data storing means, and
   with respect to the other frames, first difference data obtained by subtracting first feature data of a past frame stored in the first feature data storing means from said one-dimensional original data is generated, and first feature data is generated by approximating said first difference data by said step function, thereby extracting first feature information.

3. The image information compressing method according to claim 1, wherein
   in the step of extracting said second feature information,
   second feature data is generated by subtracting said first feature data from said one-dimensional original data,
   a second feature image is decompressed by filling a two-dimensional or three-dimensional space with said second feature data by pseudo-Hilbert scan,
   said second feature image is developed to a space constructed by base vectors by using base vectors stored in a base vector table, and
   a component value of said second feature image for a predetermined base vector in the space constructed by said base vectors is coded, thereby obtaining second feature coded data.

4. The image information compressing method according to claim 3, wherein
   in the step of coding said second feature information,
   the component value of said second feature image or said second feature data for only a base vector at which the component value of said second feature image or said second feature data in the space constructed by said base vectors is equal to or more than a predetermined threshold is coded, thereby obtaining second feature coded data.

5. The image information compressing method according to claim 3, wherein
   in the step of coding said second feature information,
   said base vector used to develop said second feature image or said second feature data is determined on the basis of a cumulative error between said one-dimensional original data and said first feature data, said second feature image or said second feature data is developed to said determined base vector, and a component value of said second feature image or said second feature data for the base vector is coded, thereby obtaining second feature coded data.

6. The image information compressing method according to claim 1, wherein
   in the step of extracting said second feature information,
   a first feature image is decompressed by filling a two-dimensional or three-dimensional space with said first feature data by pseudo-Hilbert scan,
   a second feature image is generated by subtracting said first feature image from said original image,
   said second feature image is developed to a space constructed by base vectors by using base vectors stored in a base vector table, and
   a component value of said second feature image for a predetermined base vector in the space constructed by said base vectors is coded, thereby obtaining second feature coded data.

7. The image information compressing method according to claim 1, wherein
   in the step of extracting said second feature information,
   second feature data is generated by subtracting said first feature data from said one-dimensional original data,
   said second feature image is developed to a space constructed by base vectors by using base vectors stored in a base vector table, and
   a component value of said second feature data for a predetermined base vector in the space constructed by said base vectors is coded, thereby obtaining second feature coded data.

8. An image information compressing apparatus for performing feature extraction and coding on an original image, comprising:
   pseudo-Hilbert scanning means for converting a two-dimensional or three-dimensional original image into one-dimensional original data by pseudo-Hilbert scan;
   first feature information extracting means for extracting first feature information by generating first feature data by approximating said one-dimensional original data by a step function which changes step by step every predetermined interval;
   first coding means for coding said first feature information, thereby generating first feature coded data;

second feature information extracting means for extracting second feature information by subtracting said first feature information from said original image; and second coding means for developing said second feature information to a space constructed by base vectors by using base vectors stored in a base vector table and generating second feature coded data by coding a part of a component value of said second feature information for a predetermined base vector in the space constructed by said base vectors, wherein the step function for approximating said one-dimensional original data by said first feature information extracting means is a step function in which a data value of said first feature data in each of said intervals is equal to an average value in the interval of said one-dimensional original data, and made by a series of data divided into said intervals so that a cumulative error in all of the intervals between said one-dimensional original data and said first feature data becomes the minimum or a step function in which a data value of said first feature data in each of said intervals is equal to an average value in the interval of said one-dimensional original data, and made by a series of data divided into said intervals so that a cumulative error in each of the intervals between said one-dimensional original data and said first feature data becomes equal to or less than a predetermined threshold.

9. The image information compressing apparatus according to claim 8, wherein said original image is constructed by a series of plural frames which are continuous in a time direction, the apparatus comprises first feature data storing means for storing first feature data, and said first feature information extracting means extracts, with respect to a predetermined frame, first feature information by generating first feature data by approximating said one-dimensional original data by said step function, stores said first feature data into the first feature data storing means and with respect to the other frames, extracts first feature information by generating first difference data by subtracting first feature data of a past frame stored in the first feature data storing means from said one-dimensional original data, and generating first feature data by approximating said first difference data by said step function.

10. The image information compressing apparatus according to claim 8, wherein said second feature information extracting means includes:

second feature data generating means for generating second feature data by subtracting said first feature data from said one-dimensional original data or said first difference data;

second feature image decompressing means for decompressing a second feature image by filling a two-dimensional or three-dimensional space with said second feature data by pseudo-Hilbert scan;

base vector storing means for storing a base vector table as a collection of base vectors used for developing said second feature image to a space constructed by the base vectors; and orthogonal transforming means for developing said second feature image to the space constructed by the base vectors by using the base vectors stored in said base vector storing means, and said second coding means generates second feature coded data by coding a component value of said second feature image for a predetermined base vector in the space constructed by said base vectors.

11. The image information compressing apparatus according to claim 8, wherein said second feature information extracting means includes:

first feature image decompressing means for decompressing a first feature image by filling a two-dimensional or three-dimensional space with said first feature data by pseudo-Hilbert scan;

second feature image generating means for generating a second feature image by subtracting said first feature image from said original image;

base vector storing means for storing a base vector table as a collection of base vectors used for developing said second feature image to a space constructed by the base vectors; and orthogonal transforming means for developing said second feature image to the space constructed by the base vectors by using the base vectors stored in said base vector storing means, and said second coding means generates second feature coded data by coding a component value of said second feature image for a predetermined base vector in the space constructed by said base vectors.

12. The image information compressing apparatus according to claim 8, wherein said second feature information extracting means includes:

second feature data generating means for generating second feature data by subtracting said first feature data from said one-dimensional original data or said first difference data;

base vector storing means for storing a base vector table as a collection of base vectors used for developing said second feature data to a space constructed by the base vectors; and orthogonal transforming means for developing said second feature data to the space constructed by the base vectors by using the base vectors stored in said base vector storing means, and said second coding means generates second feature coded data by coding a component value of said second feature data for a predetermined base vector in the space constructed by said base vectors.

13. The image information compressing apparatus according to claim 8, wherein said second coding means generates second feature coded data by coding the component value of said second feature image or said second feature data for only a base vector at which the component value of said second feature image or said second feature data in the space constructed by said base vectors is equal to or more than a predetermined threshold.

14. The image information compressing apparatus according to claim 8, further comprising:

determining means for determining said base vector used to develop said second feature image or said second feature data on the basis of a cumulative error between said one-dimensional original data and said first feature data, wherein said orthogonal transforming means develops said second feature image or said second feature data to the base vector determined by said determining means, and said second coding means codes a component value of said second feature image or said second feature data for the base vector used to develop said second feature image or said second feature data, thereby generating second feature coded data.

15. An image information compressing program for performing feature extraction and coding on an original image, wherein a computer is made function as:

pseudo-Hilbert scanning means for converting a two-dimensional or three-dimensional original image into one-dimensional original data by pseudo-Hilbert scan;

first feature information extracting means for extracting first feature information by generating first feature data by approximating said one-dimensional original data by a step function which changes step by step every predetermined interval;

first coding means for coding said first feature information, thereby generating first feature coded data;

second feature information extracting means for extracting second feature information by subtracting said first feature information from said original image; and second coding means for developing said second feature information to a space constructed by base vectors by using base vectors stored in a base vector table and generating second feature coded data by coding a part of a component value of said second feature information for a predetermined base vector in the space constructed by said base vectors, wherein the step function for approximating said one-dimensional original data by said first feature information extracting means is a step function in which a data value of said first feature data in each of said intervals is equal to an average value in the interval of said one-dimensional original data, and made by a series of data divided into said intervals so that a cumulative error in all of the intervals between said one-dimensional original data and said first feature data becomes the minimum or a step function in which a data value of said first feature data in each of said intervals is equal to an average value in the interval of said one-dimensional original data, and made by a series of data divided into said intervals so that a cumulative error in each of the intervals between said one-dimensional original data and said first feature data becomes equal to or less than a predetermined threshold.

16. The image information compressing program according to claim 15, for performing feature extraction and coding on original images which are continuous in a time direction, wherein a computer is made function as first feature data storing means for storing first feature data, and said first feature information extracting means extracts, with respect to a predetermined frame, first feature information by generating first feature data by approximating said one-dimensional original data by said step function, stores said first feature data into the first feature data storing means and with respect to the other frames, extracts first feature information by generating first difference data by subtracting first feature data of a past frame stored in the first feature data storing means from said one-dimensional original data, and generating first feature data by approximating said first difference data by said step function.

17. The image information compressing program according to claim 15, wherein said second feature information extracting means functions as:

second feature data generating means for generating second feature data by subtracting said first feature data from said one-dimensional original data or said first difference data;

second feature image decompressing means for decompressing a second feature image by filling a two-dimensional or three-dimensional space with said second feature data by pseudo-Hilbert scan;

base vector storing means for storing a base vector table as a collection of base vectors used for developing said second feature image to a space constructed by the base vectors; and orthogonal transforming means for developing said second feature image to the space constructed by the base vectors by using the base vectors stored in said base vector storing means, and said second coding means generates second feature coded data by coding a component value of said second feature image for a predetermined base vector in the space constructed by said base vectors.

18. The image information compressing program according to claim 15, wherein said second feature information extracting means functions as:

first feature image decompressing means for decompressing a first feature image by filling a two-dimensional or three-dimensional space with said first feature data by pseudo-Hilbert scan;

second feature image generating means for generating a second feature image by subtracting said first feature image from said original image;

base vector storing means for storing a base vector table as a collection of base vectors used for developing said second feature image to a space constructed by the base vectors; and orthogonal transforming means for developing said second feature image to the space constructed by the base vectors by using the base vectors stored in said base vector storing means, and said second coding means generates second feature coded data by coding a component value of said second feature image for a predetermined base vector in the space constructed by said base vectors.

19. The image information compressing program according to claim 15, wherein said second feature information extracting means functions as:

second feature data generating means for generating second feature data by subtracting said first feature data from said one-dimensional original data or said first difference data;

base vector storing means for storing a base vector table as a collection of base vectors used for developing said second feature data to a space constructed by the base vectors; and orthogonal transforming means for developing said second feature data to the space constructed by the base vectors by using the base vectors stored in said base vector storing means, and said second coding means generates second feature coded data by coding a component value of said second feature image for a predetermined base vector in the space constructed by said base vectors.

20. The image information compressing program according to claim 15, wherein said second coding means generates second feature coded data by coding the component value of said second feature image or said second feature data for only a base vector at which the component value of said second feature image or said second feature data in the space constructed by said base vectors is equal to or more than a predetermined threshold.

21. The image information compressing program according to claim 15, wherein a computer is made function as determining means for determining said base vector used to develop said second feature image or said second feature data on the basis of a cumulative error between said one-dimensional original data and said first feature data, said orthogonal transforming means develops said second feature image or said second feature data to the base vector determined by said determining means, and said second coding means codes a component value of said second feature image or said second feature data for the base vector used to develop said second feature image or said second feature data, thereby generating second feature coded data.

* * * * *